(12) United States Patent
Go et al.

(10) Patent No.: US 10,962,191 B1
(45) Date of Patent: Mar. 30, 2021

(54) LAMP FOR VEHICLE

(71) Applicant: SL Corporation, Daegu (KR)

(72) Inventors: Dong Hyun Go, Gyeongsan-si (KR); Hyo Jin Han, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 17/030,591

(22) Filed: Sep. 24, 2020

(30) Foreign Application Priority Data

Nov. 1, 2019 (KR) .......................... 10-2019-0138790

(51) Int. Cl.
*F21S 41/32* (2018.01)
*F21S 41/40* (2018.01)
*F21W 102/00* (2018.01)
*F21V 11/02* (2006.01)
*F21V 11/06* (2006.01)
(Continued)

(52) U.S. Cl.
CPC ............... *F21S 41/32* (2018.01); *F21S 41/40* (2018.01); *B60Q 1/0047* (2013.01); *F21S 41/20* (2018.01); *F21S 41/265* (2018.01); *F21S 41/27* (2018.01); *F21S 41/285* (2018.01); *F21S 41/43* (2018.01); *F21V 5/002* (2013.01); *F21V 5/004* (2013.01); *F21V 5/005* (2013.01); *F21V 5/008* (2013.01); *F21V 11/02* (2013.01); *F21V 11/06* (2013.01); *F21V 11/08* (2013.01); *F21V 11/12* (2013.01); *F21V 11/14* (2013.01); *F21W 2102/00* (2018.01); *G02B 3/0056* (2013.01); *G02B 3/0062* (2013.01); *G02B 3/0068* (2013.01)

(58) Field of Classification Search
CPC .......... F21V 5/002; F21V 5/004; F21V 5/005; F21V 5/008; G02B 3/0006; G02B 3/0037; G02B 3/0043; G02B 3/005; G02B 3/0056; G02B 3/0062; G02B 3/0068; G02B 3/0075; F21S 41/265; F21S 41/27; F21S 41/285; F21S 41/20; F21S 41/151; F21S 41/153; B60Q 1/0041; B60Q 1/0047
See application file for complete search history.

(56) References Cited

U.S. PATENT DOCUMENTS 10,465,874 B2 * 11/2019 Kamau .................. F21S 41/265
10,591,126 B2 * 3/2020 Mandi .................... F21S 41/143
(Continued)

FOREIGN PATENT DOCUMENTS

DE 102017112971 A1 * 12/2018 ............ F21S 41/143

OTHER PUBLICATIONS

Machine translation of DE102017112971A1 retrieved from Espacenet. (Year: 2020).*

*Primary Examiner* — Alexander K Garlen
*Assistant Examiner* — Colin J Cattanach
(74) *Attorney, Agent, or Firm* — Nelson Mullins Riley & Scarborough LLP; Kongsik Kim, Esq.

(57) ABSTRACT

A lamp for a vehicle includes a plurality of lamp modules. Each of the plurality of lamp modules comprises a light source unit including a light source; an optical path adjusting unit that adjusts a path of light generated from the light source unit; and a lens unit that emits the light incident from the optical path adjusting unit to form a first beam pattern. Further, the lens unit comprises an incident lens unit including a plurality of incident lenses; an emitting lens unit including a plurality of emitting lenses; and a shield unit disposed between the incident lens unit and the emitting lens unit to obstruct a portion of the light incident on the plurality of emitting lenses.

20 Claims, 27 Drawing Sheets

(51) Int. Cl.
*G02B 3/00* (2006.01)
*B60Q 1/00* (2006.01)
*F21V 5/00* (2018.01)
*F21V 11/12* (2006.01)
*F21V 11/08* (2006.01)
*F21S 41/20* (2018.01)
*F21V 11/14* (2006.01)
*F21S 41/43* (2018.01)
*F21S 41/265* (2018.01)
*F21S 41/27* (2018.01)

(56) References Cited

U.S. PATENT DOCUMENTS

| | | | | |
|---|---|---|---|---|
| 2005/0122737 | A1* | 6/2005 | Watanabe | F21S 41/153 |
| | | | | 362/544 |
| 2006/0274544 | A1* | 12/2006 | Inoue | F21S 41/148 |
| | | | | 362/509 |
| 2015/0109773 | A1* | 4/2015 | Li | F21V 13/12 |
| | | | | 362/231 |
| 2016/0040854 | A1* | 2/2016 | Zhang | F21V 13/02 |
| | | | | 362/242 |
| 2016/0238214 | A1* | 8/2016 | Hashimoto | G02B 3/0043 |
| 2016/0265733 | A1* | 9/2016 | Bauer | F21S 41/635 |
| 2017/0219186 | A1* | 8/2017 | Enno | F21V 5/007 |
| 2018/0335191 | A1* | 11/2018 | Stefanov | F21S 41/265 |
| 2019/0072252 | A1* | 3/2019 | Moser | F21S 41/686 |
| 2020/0363032 | A1* | 11/2020 | Murakami | F21S 41/285 |

* cited by examiner

FIG. 21

| LAMP MODULE | POSITION OF LIGHT SOURCE |
|---|---|
| FIRST LAMP MODULE | BF — 112 |
| SECOND LAMP MODULE | BF — 212 |
| THIRD LAMP MODULE | BF — 312 |

| LAMP MODULE | POSITION OF LIGHT SOURCE |
|---|---|
| FOURTH LAMP MODULE |  BF, 412 |
| FIFTH LAMP MODULE |  BF, 512 |
| SIXTH LAMP MODULE |  BF, 612 |

LAMP FOR VEHICLE

CROSS-REFERENCE TO RELATED APPLICATION

This application claims priority from Korean Patent Application No. 10-2019-0138790 filed on Nov. 1, 2019, which application is herein incorporated by reference in its entirety.

BACKGROUND

1. Technical Field

The present disclosure relates to a lamp for a vehicle, and more particularly, to a lamp for a vehicle that may be miniaturized while easily forming various beam patterns.

2. Description of the Related Art

Generally, a vehicle is equipped with various types of vehicle lamps having an illumination function for easily confirming objects in the vicinity of the vehicle in low light conditions (e.g., nighttime driving), and a signaling function for notifying other vehicles or road users of the running state of the vehicle.

For example, the main purpose of head lamps and fog lamps is the illumination function, and the main purpose of turn signal lamps, tail lamps, brake lamps, or side markers is the signaling function. In addition, the installation standards and specifications of such vehicle lamps are stipulated by regulations to allow each function to be fully utilized.

Recently, studies have been actively conducted to make the lamp for the vehicle more compact and slim by reducing the overall size using a micro lens having a relatively short focal length. In addition, the lamp for the vehicle is required to form two or more beam patterns simultaneously, if necessary. When a structure for forming each beam pattern is separately provided, there is a limitation in reducing the size of the lamp for the vehicle.

Accordingly, there is a need for a method for reducing the overall size of the lamp for the vehicle to enable miniaturization while satisfying the light distribution performance and reducing the space required for forming two or more beam patterns.

SUMMARY

Aspects of the present disclosure provide a lamp for a vehicle to ensure that the light distribution performance of a beam pattern is satisfied by adjusting a position of a light source of each of a plurality of lamp modules arranged in a left-right direction. Aspects of the present disclosure also provide a lamp for a vehicle which is able to control a region formed by light that is incident from a plurality of incident lenses to a plurality of emitting lenses in a beam pattern and is emitted therefrom, by adjusting a focal length of the plurality of incident lenses. Aspects of the present disclosure also provide a lamp for a vehicle in which two or more beam patterns are simultaneously formed by light emitted through a plurality of emitting lenses, by allowing some of the plurality of emitting lenses to have different lens characteristics from others.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a lamp for a vehicle may include a plurality of lamp modules. Each of the plurality of lamp modules may comprise a light source unit including a light source; an optical path adjusting unit that adjusts a path of light generated from the light source unit; and a lens unit that emits the light incident from the optical path adjusting unit to form a first beam pattern. Further, the lens unit may comprise an incident lens unit including a plurality of incident lenses; an emitting lens unit including a plurality of emitting lenses; and a shield unit disposed between the incident lens unit and the emitting lens unit to obstruct a portion of the light incident on the plurality of emitting lenses.

The optical path adjusting unit may adjust the path of the light so that the light generated from the light source unit may proceed substantially parallel to an optical axis of the light source. The optical path adjusting unit may comprise at least one of an aspherical lens, a Fresnel lens, or a total internal reflection (TIR) lens. The optical path adjusting unit may have an incidence surface of a flat shape and an emitting surface of an aspherical shape.

The lens unit may further comprise a first optical unit in which the incident lens unit is formed on an incident surface; and a second optical unit disposed in front of the first optical unit. The emitting lens unit may be formed on an emitting surface of the second optical unit.

A first set of the plurality of lamp modules may have a thickness of the first optical unit, measured in a front-and-rear direction, that is different from a thickness of the first optical unit in a second set of the plurality of lamp modules. The first set of the plurality of lamp modules may form a high illuminance region of the first beam pattern, and the second set of the plurality of lamp modules may form a spread region of the first beam pattern. In particular, the first set of the plurality of lamp modules may have a smaller thickness of the first optical unit than the second set of the plurality of lamp modules.

In the first set of the plurality of lamp modules, the first optical unit and the second optical unit may have a same thickness. In the second set of the plurality of lamp modules, a thickness of the first optical unit may be greater than a thickness of the second optical unit. A focal length of the plurality of incident lenses in the first set of the plurality of lamp modules may be shorter than a focal length of the plurality of incident lenses in the second set of the plurality of lamp modules. A curvature of the plurality of incident lenses in the first set of the plurality of lamp modules may be greater than a curvature of the plurality of incident lenses in the second set of the plurality of lamp modules.

The shield unit may comprise a plurality of first shields and a plurality of second shields respectively formed on the incident surface and the emitting surface of either of the first optical unit or the second optical unit.

The plurality of emitting lenses may be arranged in rows, each extending in a left-right direction, and the rows may be arranged in an up-down direction. Further, the emitting lens unit may be configured to form a second beam pattern that is different from the first beam pattern by at least one row of a plurality of rows arranged in the up-down direction. In particular, the emitting lens unit may be configured to form the second beam pattern by at least one row disposed at a lower side of the emitting lens unit. The light incident on an emitting lens of the at least one row that forms the second beam pattern may be partially obstructed by at least one of a first shield or a second shield disposed in front of the first shield.

The emitting lens of the at least one row that forms the second beam pattern may have an upper side and a lower side formed asymmetrically with respect to a reference line that extends in a front-rear direction. In the emitting lens of the at least one row that forms the second beam pattern, the upper side and the lower side may have different curvatures. In the emitting lens of the at least one row that forms the second beam pattern, the upper side and the lower side may have different lengths in the up-and-down direction.

A lamp for a vehicle according to the present disclosure may present one or more of the following benefits. Since the light distribution performance of a beam pattern may be satisfied by adjusting a position of each of a plurality of lamp modules arranged in left and right directions, a structure for satisfying the light distribution performance may be simplified.

In addition, by adjusting a focal length of a plurality of incident lenses, it is possible to control a region formed by the light that is incident from a plurality of incident lenses to a plurality of emitting lenses in a beam pattern and is emitted therefrom. Therefore, a variety of beam patterns may be more easily formed.

In addition, since one or more beam patterns may be simultaneously formed by some of a plurality of emitting lenses having different lens characteristics from others, a structure for forming two or more beam patterns may be simplified.

The benefits of the present disclosure are not limited to the above-mentioned benefits, and other benefits not mentioned may be clearly understood by a person skilled in the art from the claims.

BRIEF DESCRIPTION OF THE DRAWINGS

The above and other aspects and features of the present disclosure will become more apparent by describing in detail exemplary embodiments thereof with reference to the attached drawings, in which:

FIG. 21 is a schematic view showing a light source of a lamp module included in a first lamp unit according to the exemplary embodiment of the present disclosure;

DETAILED DESCRIPTION

Figure 1:
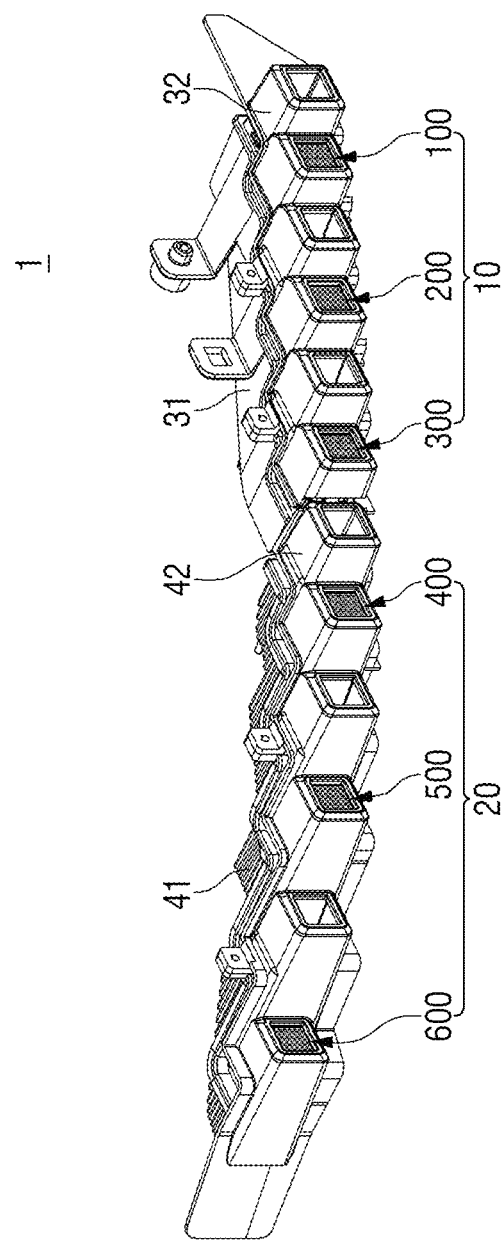
FIG. 1 is a perspective view showing a lamp for a vehicle according to an exemplary embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some exemplary embodiments, well-known steps, structures and techniques will not be described in detail to avoid obscuring the disclosure.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The terms "front," "forward," or the like may refer to a direction toward which the light from the lamp is emitted, and the terms "rear," "rearward," or the like may refer to a direction opposite to the forward direction. Similarly, the term "distal" may refer to a side farther downstream in the forward direction, and the term "proximal" may refer to a side farther upstream in the rearward direction.

Exemplary embodiments of the disclosure are described herein with reference to plan and cross-section illustrations that are schematic illustrations of idealized exemplary embodiments of the disclosure. As such, variations from the shapes of the illustrations as a result, for example, of manufacturing techniques and/or tolerances, are to be expected. Thus, exemplary embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to the drawings for explaining a lamp for a vehicle according to exemplary embodiments of the present disclosure.

Figure 2:
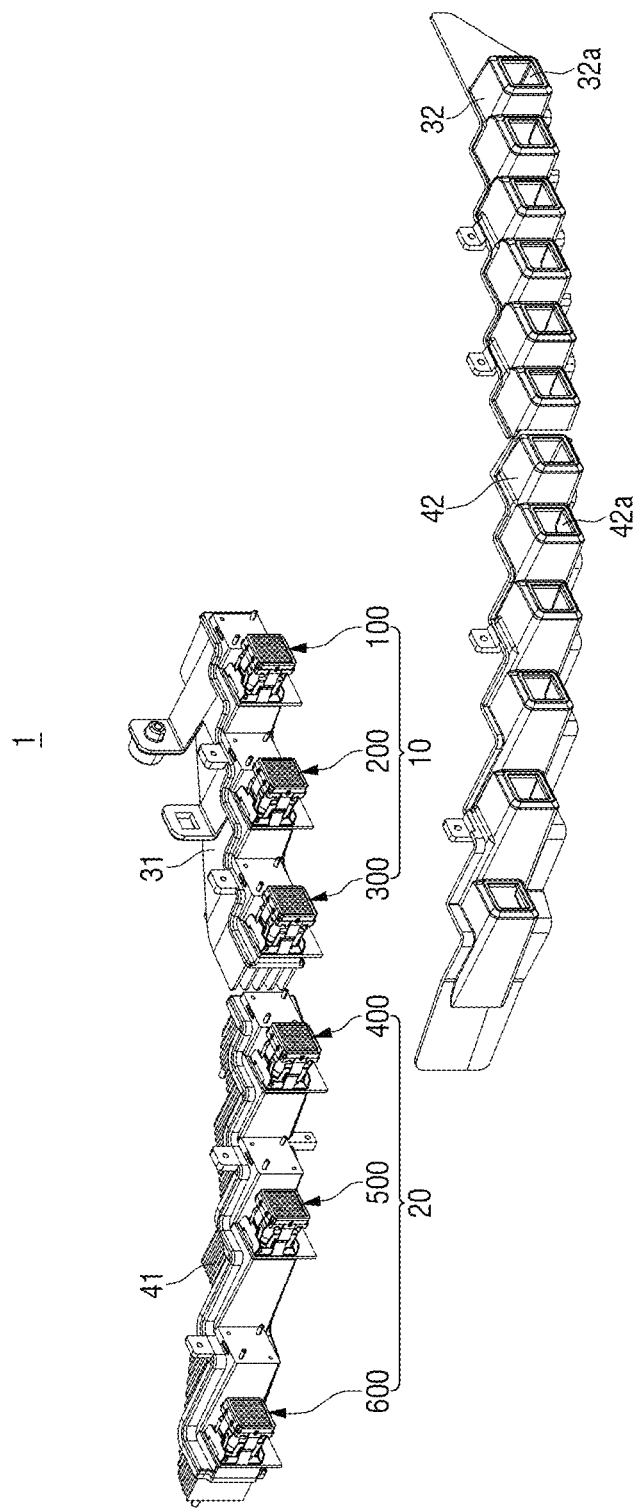
FIG. 2 is an exploded perspective view of the lamp for the vehicle according to the exemplary embodiment of the present disclosure.
Figure 3:
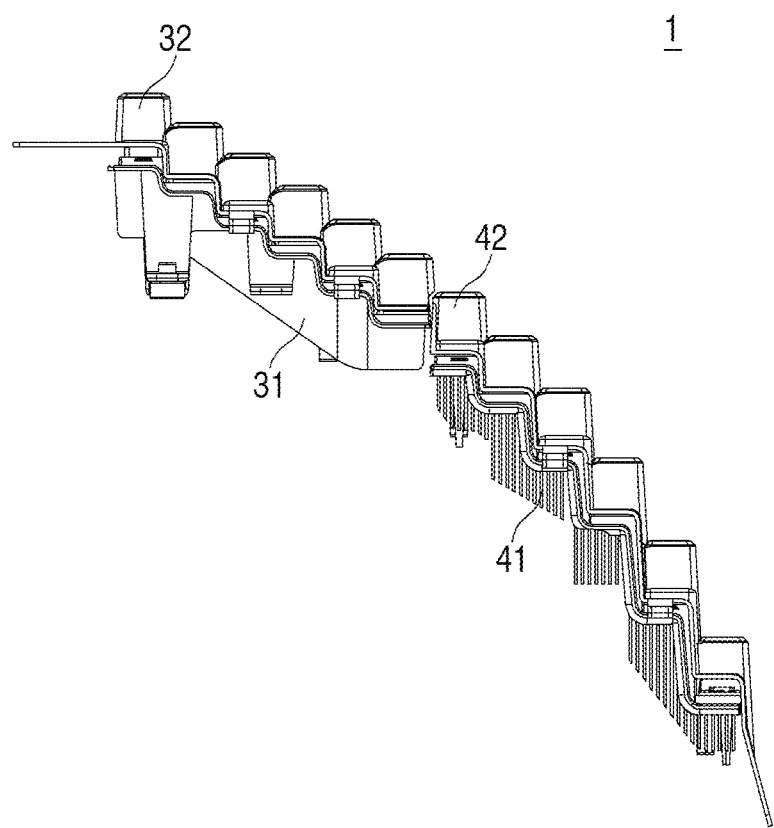
FIGS. 3 and 4 are plan views showing the lamp for the vehicle according to the exemplary embodiment of the present disclosure.
Figure 4:
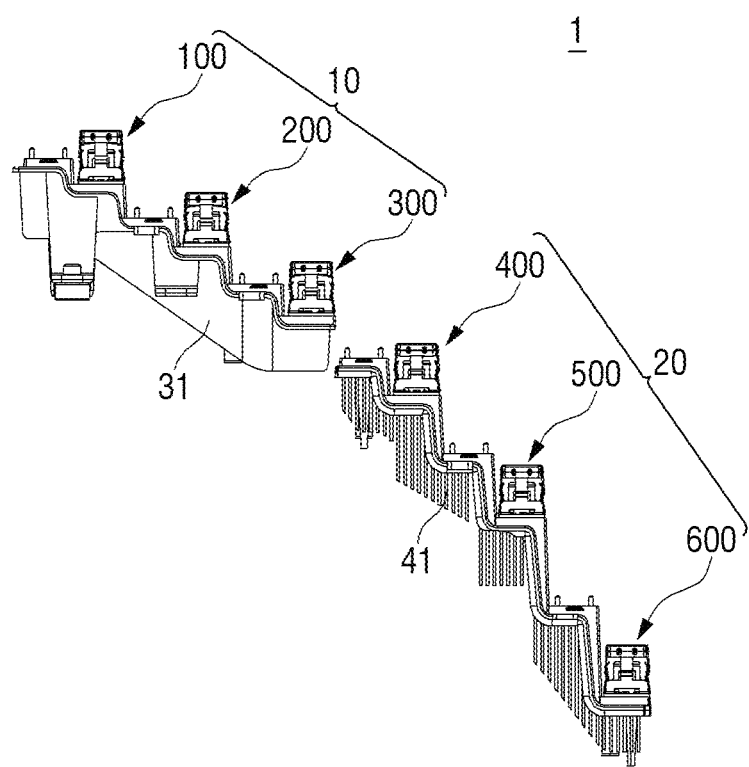

FIG. 1 is a perspective view showing a lamp for a vehicle according to an exemplary embodiment of the present disclosure, FIG. 2 is an exploded perspective view of the lamp for the vehicle according to the exemplary embodiment of the present disclosure, and FIGS. 3 and 4 are plan views showing the lamp for the vehicle according to the exemplary embodiment of the present disclosure. In particular, FIG. 4 is an example shown with bezels 32 and 42 of FIG. 3 removed for description purposes. Referring to FIGS. 1 to 4, the lamp for the vehicle 1 according to the exemplary embodiment of the present disclosure may include a first lamp unit 10 and a second lamp unit 20 that are arranged in a left-right direction (e.g., horizontal direction or lateral direction) to allow different regions of a beam pattern to be formed.

In an example of the exemplary embodiment of the present disclosure, the lamp for the vehicle 1 may be used for the purpose of a headlamp installed on both sides of the vehicle to secure a driver's forward view by irradiating light toward a front of the vehicle when the vehicle is operating in low light conditions (e.g., at night or in a dark place such as a tunnel). However, the usage of the lamp for the vehicle 1 according to the exemplary embodiment of the present disclosure is not limited thereto, and it may be used not only as the head lamp but also as various lamps installed in a vehicle such as a tail lamp, a brake lamp, a fog lamp, a position lamp, a turn signal lamp, a daytime running lamp, a backup lamp, or the like.

Further, when the lamp for the vehicle 1 is used as the head lamp in an exemplary embodiment of the present disclosure, the lamp for the vehicle 1 will be exemplified for the case where it forms a low beam pattern that prevents light from causing glare to a driver of a proceeding or on-coming vehicle and irradiates the beam on a lower side with respect to a predetermined cut-off line. However, the lamp for the vehicle 1 of the present disclosure is not limited thereto, and various beam patterns may be formed according to the usage, and two or more beam patterns may be formed simultaneously.

The first lamp unit 10 and the second lamp unit 20 may include different parts of a plurality of lamp modules 100, 200, 300, 400, 500, and 600 arranged in the left-right direction. Hereinafter, in the exemplary embodiment of the present disclosure, the plurality of lamp modules 100, 200, 300, 400, 500, and 600 will be referred to, in an order from the inboard of the vehicle toward the outboard along the left-right direction will be referred to as first to sixth lamp modules 100, 200, 300, 400, 500, and 600, respectively. Herein, the left-right direction may be understood as the lateral direction (e.g., a width-wise direction) of the vehicle.

In an exemplary embodiment of the present disclosure, it will be described as an example in which the lamp 1 of the vehicle is a right-side (i.e., passenger-side according to the U.S. custom) head lamp where the first to sixth lamp modules 100, 200, 300, 400, 500, and 600 are positioned progressively rearward going from the first lamp module 100 toward the sixth lamp module 600. A left-side (i.e., driver-side according to the U.S. custom) head lamp may be horizontally symmetrical with the right-side head lamp.

The first to sixth lamp modules 100, 200, 300, 400, 500, and 600 may be positioned progressively rearward going from the first lamp module 100 toward the sixth lamp module 600, to conform a shape of an exterior surface of the vehicle, for example, a shape of an exterior surface of a cover lens of a head lamp that allows light to be irradiated to the outside of the vehicle, which is inclined or has a curvature in the left-right direction rather than a flat shape that directly faces the front of the vehicle. However, depending on the shape of the exterior surface of the vehicle, the positions of the first to sixth lamp modules 100, 200, 300, 400, 500, 600 may be variously changed.

Figure 5:
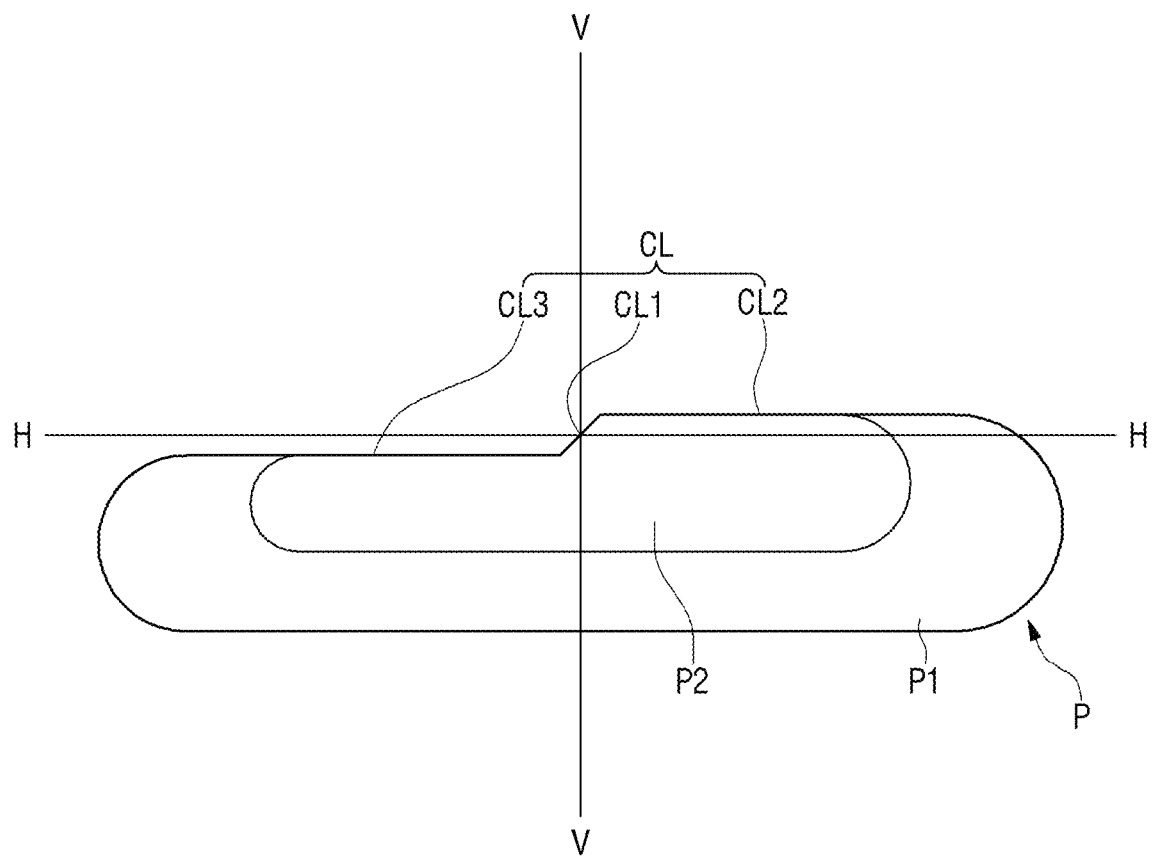
FIGS. 5 to 7 are schematic diagrams showing a beam pattern formed by the lamp for the vehicle according to the exemplary embodiment of the present disclosure.

The first lamp unit 10 may be disposed more inboard compared to the second lamp unit 20. The first lamp unit 10 may form a spread region of a beam pattern, and the second lamp unit 20 may form a high illumination region of the beam pattern. For example, the lamp for the vehicle 1 of the present disclosure may form a low beam pattern P having a predetermined cut-off line CL as shown in FIG. 5, in which the first lamp unit 10 may form a spread region P1 of the low beam pattern P, and the second lamp unit 20 may form a high illumination region P2 of the low beam pattern P. It may be understood that the spread region P1 is a region where a brightness is lower compared to the high illuminance region P2, which is primarily for securing a viewing distance in front of the vehicle, and where it expands a region in which light is irradiated in at least one of the left-right direction and an up-down direction (e.g., vertical direction) with respect to the high illuminance region P2, to secure a wider field of view.

Figure 6:
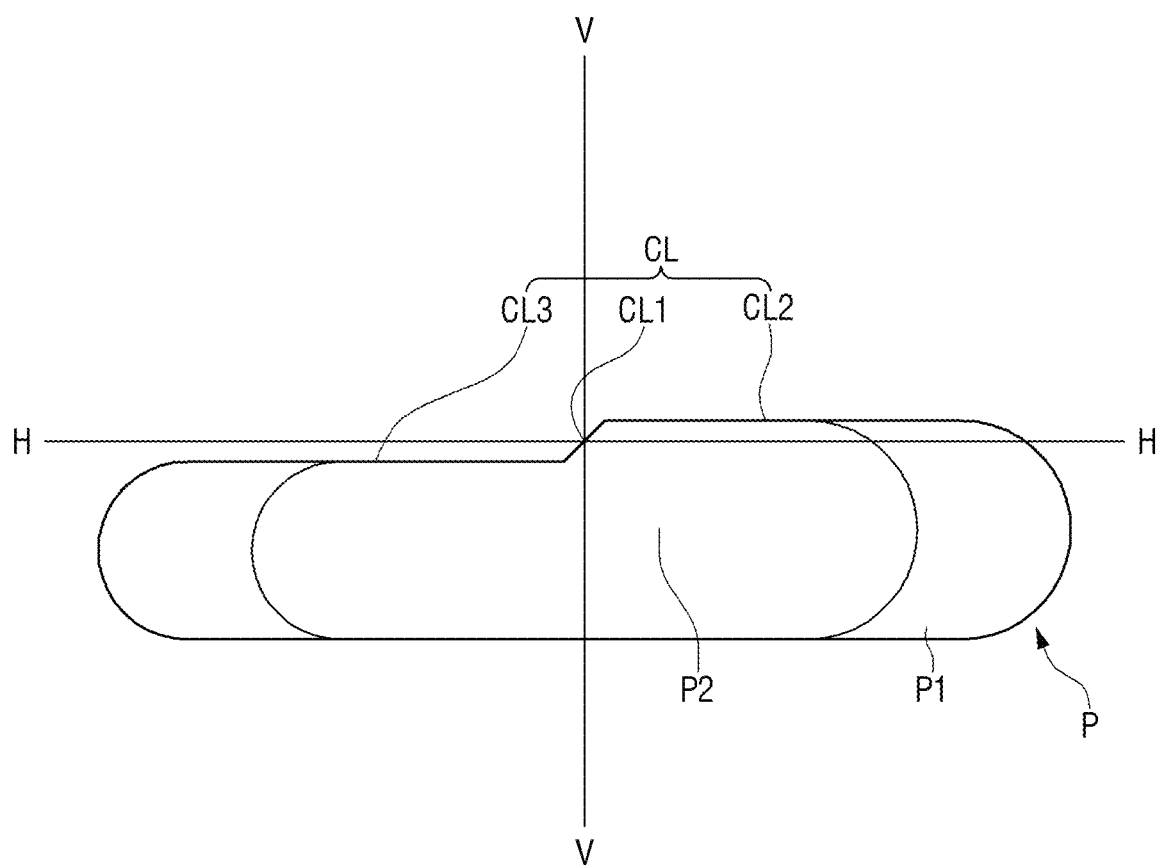
Figure 7:
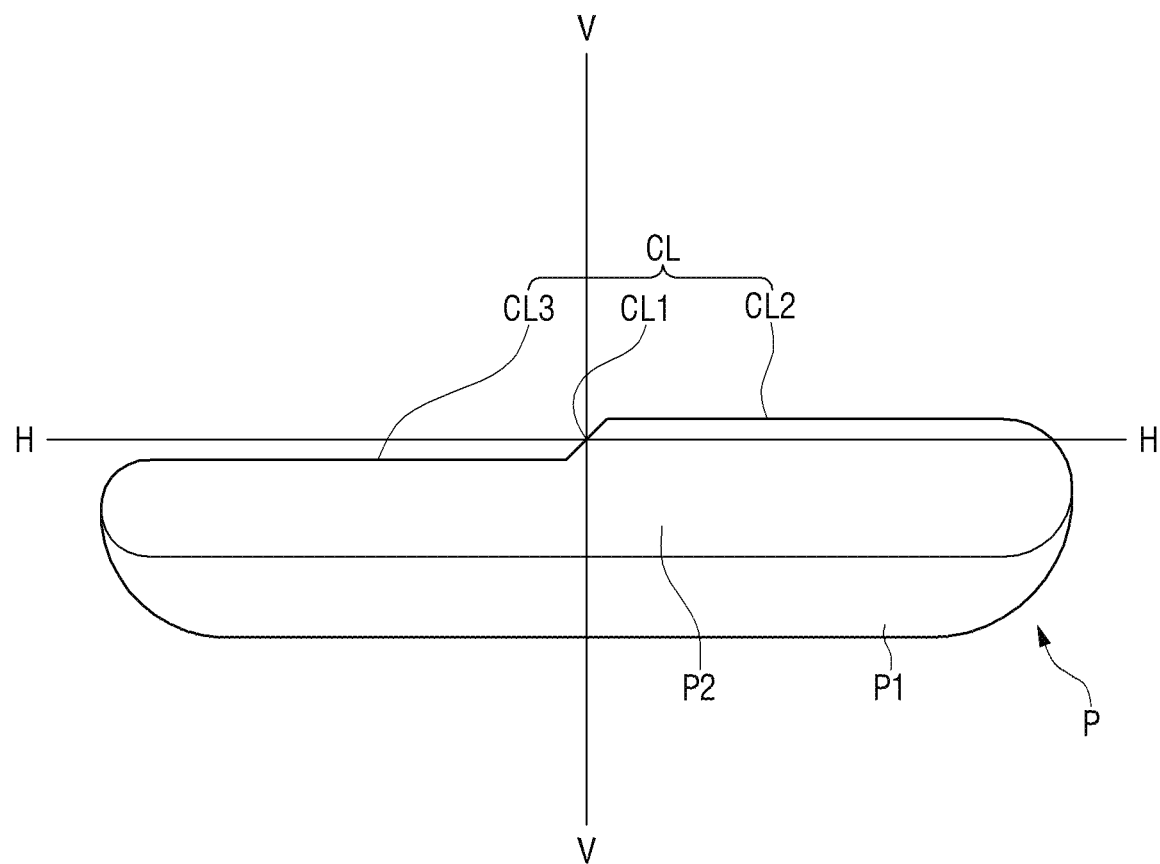

In FIG. 5 of the present disclosure, it is described as an example in which the spread region P1 expands the region to which the light is irradiated in both the left-right direction and the up-down direction with respect to the high illuminance region P2. However, the present disclosure is not limited thereto. The spread region P1 may expand a region to which the light is irradiated only in the left-right direction with respect to the high illumination region P2 as shown in FIG. 6, and may expand a region to which light is irradiated only in the up-down direction with respect to the high illuminance region P2 as shown in FIG. 7. Hereinafter, in an exemplary embodiment of the present disclosure, the description will be given for an example shown in FIG. 5 as such description will similarly apply to the examples shown in FIGS. 6 and 7.

The positions of the first lamp unit 10 and the second lamp unit 20 and regions formed by the first lamp unit 10 and the second lamp unit 20 are not limited to the examples described above. One of the first lamp unit 10 or the second lamp unit 20 may be disposed more inboard than the other. One of the first lamp unit 10 or the second lamp unit 20 may form the spread region, and the other may form the high illuminance region. The first lamp unit 10 may include the first to third lamp modules 100, 200, and 300 disposed relatively inboard among the first to sixth lamp modules 100, 200, 300, 400, 500, and 600. The second lamp unit 20 may include the fourth to sixth lamp modules 400, 500, and 600 disposed relatively outboard among the first to sixth lamp modules 100, 200, 300, 400, 500, and 600.

In an exemplary embodiment of the present disclosure, the number of the plurality of lamp modules 100, 200, 300, 400, 500, and 600 may be six, and each of the first lamp unit 10 and the second lamp unit 20 includes three lamp modules. However, this configuration is only an example for helping the understanding of the present disclosure, and the present disclosure is not limited thereto. The number of the plurality of lamp modules 100, 200, 300, 400, 500, and 600 and the number of lamp modules included in each of the first lamp unit 10 and the second lamp unit 20 may vary depending on the beam pattern to be formed by the lamp for the vehicle 1 of the present disclosure. Each of the first lamp unit 10 and the second lamp unit 20 may include two or more lamp modules so that light distribution performance such as, for example, a light irradiation angle in the left-right direction may be satisfied. In particular, the lamp for the vehicle 1 of the present disclosure may include four or more lamp modules.

In the first lamp unit 10, the first to third lamp modules 100, 200, and 300 may be mounted on a front surface of a first heat dissipation unit 31. Light generated from at least one of the first to third lamp modules 100, 200, and 300 may be guided forward through at least one of a plurality of guide holes 32a formed in a first bezel 32 that is disposed in front of the first heat dissipation unit 31. Accordingly, a beam pattern suitable for the use of the lamp for the vehicle 1 of the present disclosure may be formed.

Further, a space in which the first to third lamp modules 100, 200, and 300 are mounted may be formed in the first heat dissipation unit 31. In addition, the first heat dissipation unit 31 may also include a space in which a lamp module for forming a beam pattern for different uses (e.g., a beam pattern according to the use of a daytime running lamp, a turn signal lamp, a position lamp, or the like) is received on at least one side of the first to third lamp modules 100, 200 and 300.

In addition, in the second lamp unit 20, the fourth to sixth lamp modules 400, 500, and 600 may be mounted on a front surface of a second heat dissipation unit 41. Light generated from at least one of the fourth to sixth lamp modules 100, 200, and 300 may be guided forward through at least one of a plurality of guide holes 42a formed in a second bezel 42 that is disposed in front of the second heat dissipation unit 41. Accordingly, a beam pattern suitable for the use of the lamp for the vehicle 1 of the present disclosure may be formed.

Further, a space in which the fourth to sixth lamp modules 400, 500, and 600 are mounted may be formed in the second heat dissipation unit 41. In addition, the second heat dissipation unit 41 may also include a space in which a lamp module for forming a beam pattern for different uses (e.g., a beam pattern according to the use of a daytime running lamp, a turn signal lamp, a position lamp, or the like) from the fourth to sixth lamp modules 400, 500, and 600 is received on at least one side of the fourth to sixth lamp modules 400, 500, and 600.

In an exemplary embodiment of the present disclosure, it is described as an example in which the first and second heat dissipation units 31 and 41 and the bezels 32 and 42 for the first lamp unit 10 and the second lamp unit 20 are separately provided, respectively. However, the present disclosure is not limited thereto. The first heat dissipation unit 31 and the second heat dissipation unit 41 may be integrally formed, and the first bezel 32 and the second bezel 42 may be integrally formed.

Figure 8:
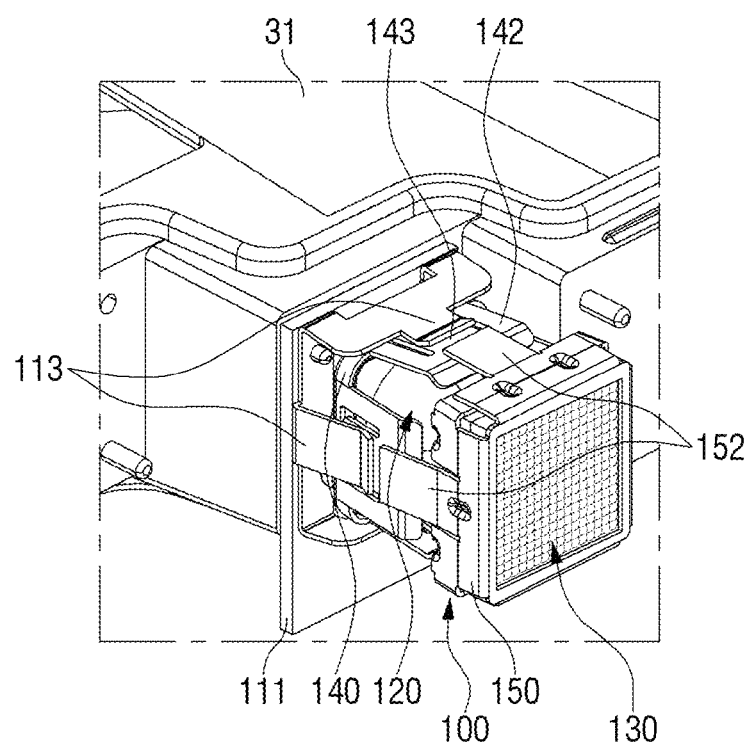
FIG. 8 is a perspective view showing a lamp module according to the exemplary embodiment of the present disclosure.
Figure 9:
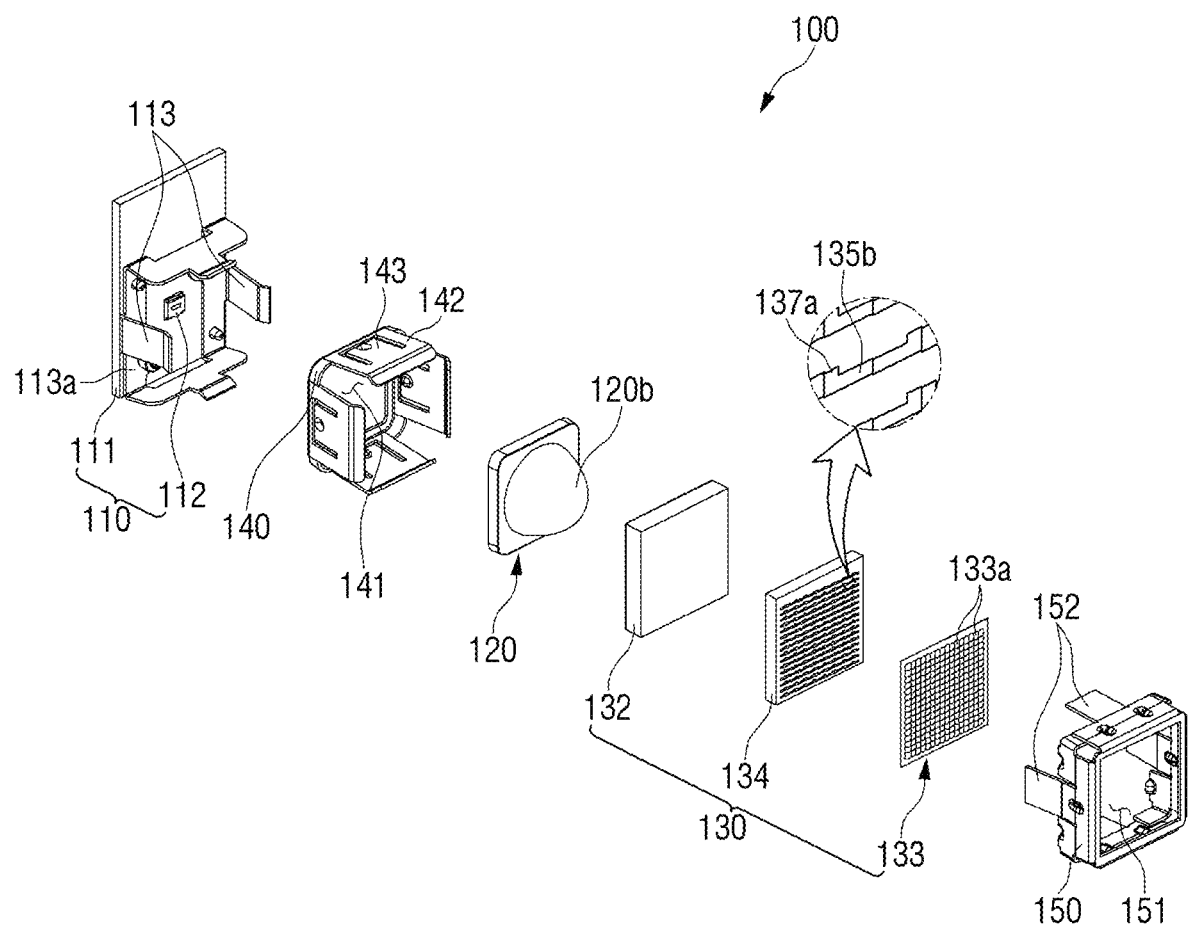
FIGS. 9 and 10 are exploded perspective views showing the lamp module according to the exemplary embodiment of the present disclosure.
Figure 10:
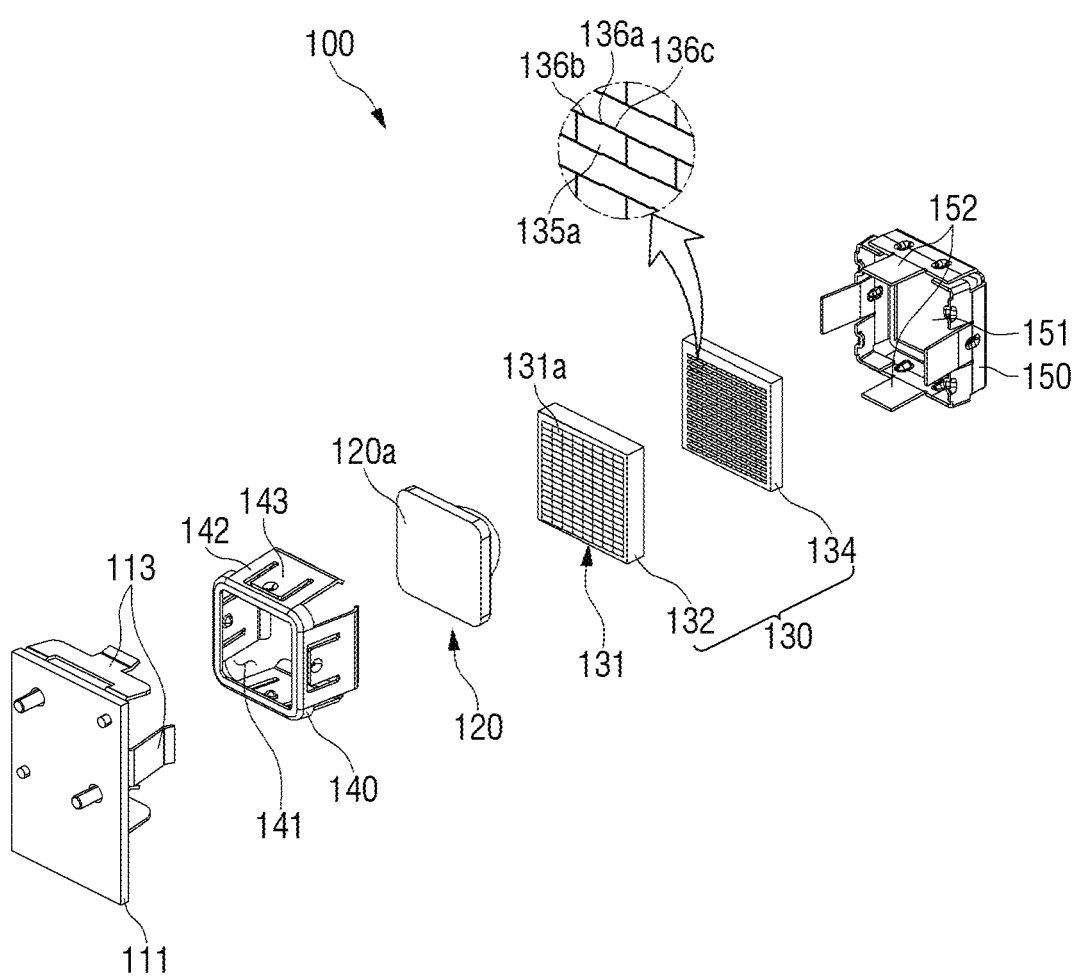
Figure 11:
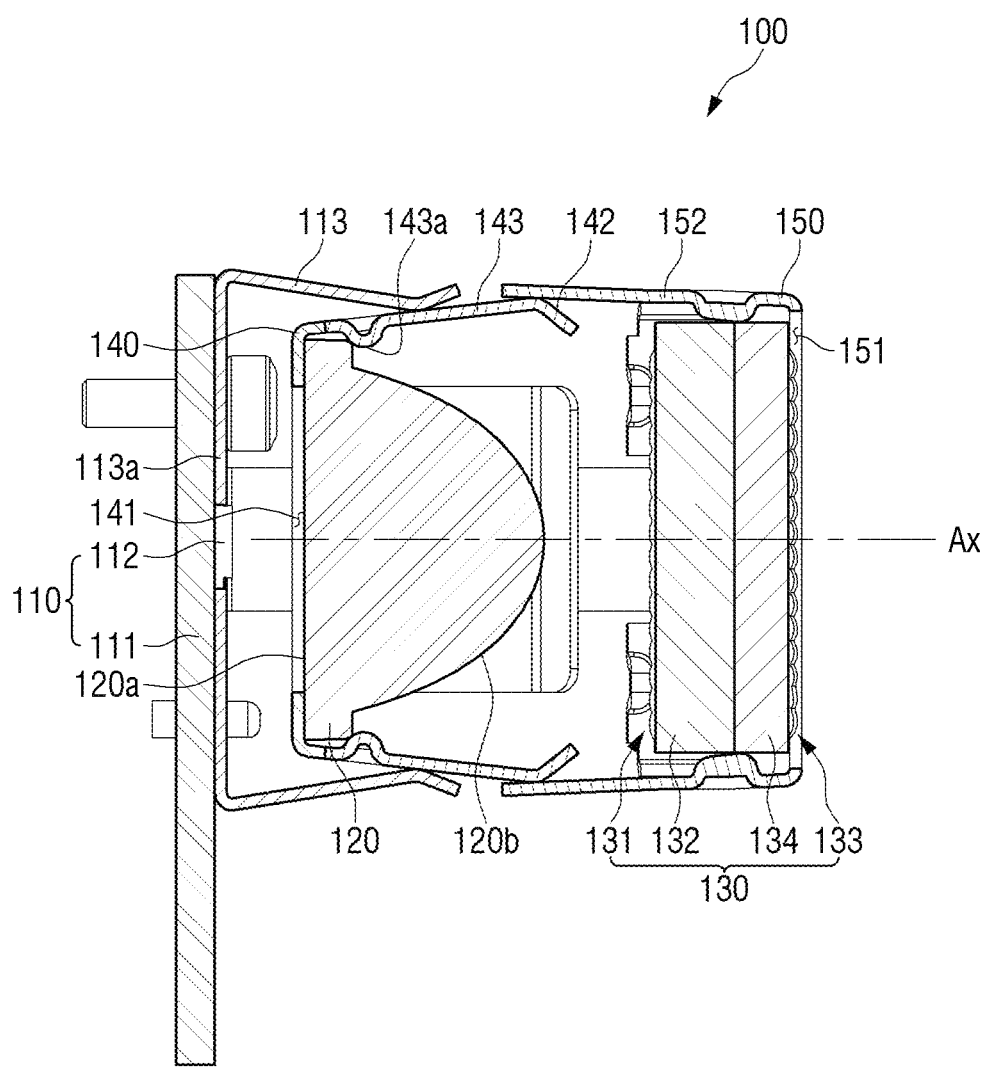
FIG. 11 is a sectional view showing the lamp module according to the exemplary embodiment of the present disclosure.

FIG. 8 is a perspective view showing a lamp module according to the exemplary embodiment of the present disclosure, FIGS. 9 and 10 are exploded perspective views showing the lamp module according to the exemplary embodiment of the present disclosure, and FIG. 11 is a sectional view showing the lamp module according to the exemplary embodiment of the present disclosure. Here, FIGS. 9 to 11 are shown with the heat dissipation unit 31 of FIG. 8 removed for description purposes. Further, FIGS. 8 to 11 depict the first lamp module 100 among the first to sixth lamp modules 100, 200, 300, 400, 500, and 600. The remaining lamp modules 200, 300, 400, 500, and 600 may also be configured as functionally identical or similar, but there may be some differences in terms of the positions of some components.

Referring to FIGS. 8 to 11, the first lamp module 100 according to the exemplary embodiment of the present disclosure may include a light source unit 110, an optical path adjusting unit 120, and a lens unit 130. The light source unit 110 may include a substrate 111 and a light source 112 installed on the substrate 111. Various components for controlling the light source 112 or supplying power to the light source 112 may be installed on the substrate 111, including the light source 112. The substrate 111 may be mounted on the first heat dissipation unit 31 for heat dissipation which prevents the luminescence performance from deteriorating due to the heat generated from the light source 112. The light source 112 may include at least one light emitting device. In an exemplary embodiment of the present disclosure, it will be described as an example in which a semiconductor light emitting element such as a Light Emitting Diode (LED) is used as the light emitting element.

The light source unit 110 may include a plurality of fixing units 113, each of which includes a distal end that extends forward from a proximal end close to the substrate 111. The plurality of fixing units 113 may be disposed to face each other at both sides of the substrate 111, and may fix the position of the optical path adjusting unit 120 by elastically applying a force to both sides of the optical path adjusting unit 120 when assembling the optical path adjusting unit 120, which will be described below.

In an exemplary embodiment of the present disclosure, the plurality of fixing units 113 may be formed by bending forward from the proximal end connected to one side of a fixing bracket 113a that is coupled to the substrate 111. However, the present disclosure is not limited thereto, and the proximal end of the plurality of fixing units 113 may be directly coupled to the substrate 111 without a fixing bracket 113a.

Each of the plurality of fixing units 113 may be formed such that at least one portion between both ends is disposed laterally or radially closer to an optical axis Ax of the light source 112 than the proximal end. Therefore, when assembling the optical path adjusting unit 120, which will be described below, the plurality of fixing units 113 may receive a lateral force that exerts in a direction away from the optical axis Ax of the light source 112 with respect to the proximal end. Accordingly, the position of the optical path adjusting unit 120 may be fixed by a restoring force generated from the plurality of fixing units 113. Herein, the optical axis Ax of the light source 112 may be defined as an imaginary line that passes through the center of a region in which the light is generated from at least one light emitting element included in the light source 112 along a front-rear direction (e.g., longitudinal direction or axial direction).

The optical path adjusting unit 120 may be fixed by a support bracket 140 in which a light transmission hole 141 is formed to allow the light generated from the light source 112 to enter the optical path adjusting unit 120. The support bracket 140 may include a plurality of supports 142 formed to extend forward from a rim of the light transmission hole 141. Each of the plurality of supports 142 may include a support rib 143 that allows the optical path adjusting unit 120 to be fixed by an elastic force in a direction toward the optical axis Ax of the light source 112 by each of the plurality of fixing units 113.

The support rib 143 may be formed such that a first end is connected to the support 142 and a second end is separated from the support 142. The support rib 143 may be elastically deformed with respect to the first end thereof that is connected to the support 142 when receiving a force by the fixing unit 113, and may fix the position of the optical path adjusting unit 120. Further, the support rib 143 may include a protrusion 143a that protrudes toward the optical axis Ax on a surface facing the optical path adjusting unit 120. The protrusion 143a may be disposed in front of an outer peripheral edge of the optical path adjusting unit 120 when the optical path adjusting unit 120 is received within the support bracket 140 so that a proximal side of the optical path adjusting unit 120 is in contact with an edge of the light transmission hole 141 and fixed.

The optical path adjusting unit 120 may allow the light generated from the light source 112 to proceed substantially parallel with the optical axis Ax of the light source 112 so that the light may uniformly reach the lens unit 130, which will be described below. In an exemplary embodiment of the present disclosure, the optical path adjusting unit 120 may be an aspherical lens in which an incident surface 120a to which light is incident has no curvature (e.g., flat), and an emitting surface 120b from which light is emitted has an aspherical curvature. However, the present disclosure is not limited thereto, and the optical path adjusting unit 120 may include various lenses that may adjust the path of light and convert the light from the light source 112 emitted with a predetermined irradiation angle with respect to the optical axis Ax to substantially parallel light with respect to the optical axis Ax. For example, a Fresnel lens or a total internal reflection (TIR) lens may be used.

The lens unit 130 may emit the light that is incident from the light path adjusting unit 120 to form a beam pattern based on the function of the lamp for the vehicle 1 of the present disclosure. The lens unit 130 may be fixed by a lens holder 150 in which an opening 151 is formed to allow the light incident from the optical path adjusting unit 120 to be emitted. The lens holder 150 may include a plurality of fixing ribs 152 that extend rearward from an edge of the opening 151. The lens holder 150 may be coupled with the support bracket 140 to fix the lens unit 130 therebetween.

The lens unit 130 may be interposed between fixing ribs 152 formed to face each other among the plurality of fixing ribs 152 and may be fixed. Each of the plurality of fixing ribs 152 may apply a force to each of the plurality of supports 142 in a direction toward the optical axis Ax of the light source 112. Accordingly, a restoring force may be generated from each of the plurality of supports 142 so that the positions of the support bracket 140 and the lens holder 150 may be fixed with respect to each other.

To this end, the plurality of supports 142 may be formed such that a distal end that is closer to the lens unit 130 is radially or laterally farther from the optical axis Ax of the light source 112 than a proximal end that is connected to the edge of the light transmission hole 141. When a force is applied to the distal end of the plurality of supports 142 by the plurality of fixed ribs 152 toward the optical axis Ax of the light source 112, the position of the lens unit 130 may be fixed by the restoring force generated from the plurality of supports 142.

The lens unit 130 may include an incident lens unit 131, a first optical unit 132, an emitting lens unit 133, a second optical unit 134, and a shield unit 135. The incident lens unit 131 may include a plurality of incident lenses 131a that form rows, each extending in the left-right direction, and the rows that extend in the left-right direction may be arranged in the up-down direction. The plurality of incident lenses 131a may be formed to have a convex shape toward the optical path adjusting unit 120. In an exemplary embodiment of the present disclosure, the plurality of incident lenses 131a may include a micro lens having a relatively short focal length to reduce the overall size of the lamp for the vehicle 1 of the present disclosure.

The incident lens unit 131 may be formed on an incident surface of the first optical unit 132 where light is incident from the optical path adjusting unit 120, and may be made of a material through which light may be transmitted, such as glass. In an exemplary embodiment of the present disclosure, the incident lens unit 131 may be integrally formed with the first optical unit 132 by surface processing of the first optical unit 132. However, the present disclosure is not limited thereto, and the incident lens unit 131 may be formed in a film form and attached (e.g., laminated) to the first optical unit 132.

Figure 12:
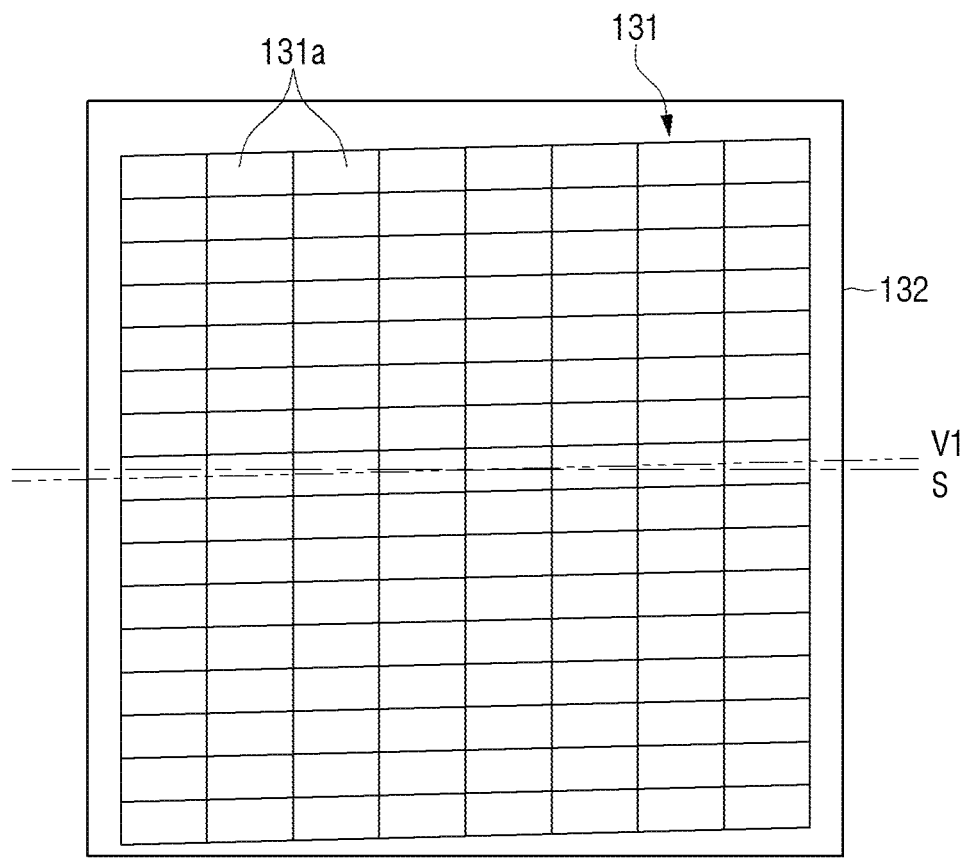
FIG. 12 is a schematic view showing an incident lens unit according to the exemplary embodiment of the present disclosure.

The plurality of incident lenses 131a may be arranged such that the rows in the left-right direction are inclined at a predetermined angle. In other words, as shown in FIG. 12, an imaginary line that connects a corresponding point of each incident lens arranged to form the row in the left-right direction, for example, an imaginary line V1 that connects the center of each incident lens arranged to form the row in the left and right direction, may be inclined to have a predetermined angle with respect to a horizontal line S.

The emitting lens unit 133 may include a plurality of emitting lenses 133a that are arranged to form rows, each extending in the left-right direction, and the rows in the left-right direction may be arranged in the up-down direction. The plurality of emitting lenses 133a may be formed to have a convex shape toward the front. In an exemplary embodiment of the present disclosure, the plurality of emitting lenses 133a may include a micro lens having a relatively short focal length to reduce the overall size of the lamp for the vehicle 1 of the present disclosure.

The emitting lens unit 133 may be formed on an emitting surface of the second optical unit 134 from which light is emitted forward and be made of a material through which light may be transmitted, such as glass. In an exemplary embodiment of the present disclosure, the emitting lens unit 133 may be formed integrally with the second optical unit 134 by surface processing of the second optical unit 134. However, the present disclosure is not limited thereto, and the emitting lens unit 133 may be formed in a film form and attached (e.g., laminated) to the second optical unit 134.

Further, similar to the plurality of incident lenses 131a, the plurality of emitting lenses 133a may be arranged such that the rows in the left-right direction are inclined at a predetermined angle. In other words, as shown FIG. 13, an imaginary line that connects a corresponding point of each emitting lens arranged to form the rows in the left and right direction, for example, an imaginary line V2 that connects the center, may be inclined to have a predetermined angle with respect to the horizontal line S.

In an exemplary embodiment of the present disclosure, each of the plurality of incident lenses 131a may be a semi-cylindrical lens that extends in the left-right direction, and the light emitted from each of the plurality of incident lenses 131a may be incident to one or more of the plurality of emitting lenses 133a arranged in an extending direction of the plurality of incident lenses 131a. For example, the light emitted from each of the plurality of incident lenses 131a may be incident to two or more of the plurality of emitting lenses 133a.

The number of emitting lenses 133a to which the light emitted from each of the plurality of incident lenses 131a is incident is not limited to the example as described above. The incident lenses 131a and the emitting lenses 133a may correspond to each other one-to-one, one-to-many, many-to-one, many-to-many, or the like depending on a shape of the plurality of incident lenses 131a and the plurality of emitting lenses 133a. Accordingly, the light emitted from each of the plurality of incident lenses 131a may be incident on at least two of the plurality of emitting lenses 133a. This arrangement may improve the spread characteristics of the beam pattern formed by the lamp for the vehicle 1 of the present disclosure.

Figure 13:
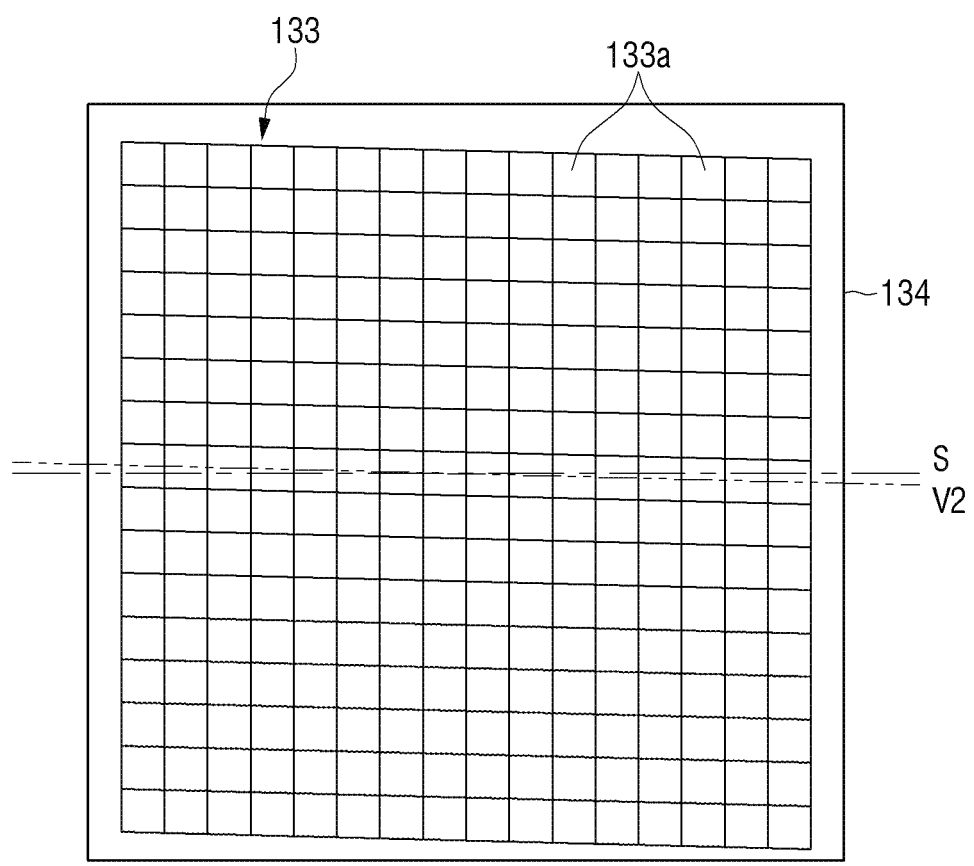
FIG. 13 is a schematic view showing an emitting lens unit according to the exemplary embodiment of the present disclosure.

FIG. 12 described above shows that the plurality of incident lenses 131a are arranged such that rows in the left-right direction are inclined at a predetermined angle when the incident lens unit 131 is viewed from the rear of the lens unit 130. FIG. 13 described above shows that the plurality of emitting lenses 133a are arranged such that rows in the left-right direction are inclined at a predetermined angle when the emitting lens unit 133 is viewed from the front of the lens unit 130. It may be understood that the plurality of incident lenses 131a and the plurality of emitting lenses 133a may be arranged such that the rows in the left-right direction are inclined in the same direction with respect to the horizontal line S.

The second optical unit 134 may be disposed in front of the first optical unit 132, and more particularly, may be disposed so that surfaces facing each other are in contact. However, the present disclosure is not limited thereto, and the first optical unit 132 and the second optical unit 134 may be disposed to be spaced apart by a predetermined interval to promote diffusion of light or the like.

The shield unit 135 may be disposed between the incident lens unit 131 and the emitting lens unit 133, and may obstruct a portion of the light emitted to each of the plurality of emitting lenses 133a to form a cut-off line of the beam pattern. The shield unit 135 may include a plurality of first shields 135a and a plurality of second shields 135b which are respectively formed on the incident surface and the emitting surface of either of the first optical unit 132 or the second optical unit 134. In an exemplary embodiment of the present disclosure, the plurality of first shields 135a may be formed on the incident surface of the second optical unit 134, which is a surface facing the first optical unit 132, and the plurality of second shields 135b may be formed on the emitting surface of the second optical unit 134, which is a surface facing forward.

Each of the plurality of first shields 135a may have an upper center portion that is disposed at or near a focal point of the incident lens and the emitting lens that correspond to each other among the plurality of incident lenses 131a and the plurality of emitting lenses 133a. Therefore, the cut-off line CL of FIG. 5 as described above may be formed by obstructing a portion of light that is incident on each of the plurality of emitting lenses 133a.

On a top side of each of the plurality of first shields 135a, an inclined edge 136a configured to form the inclined line CL1, a first edge 136b configured to form an upper line CL2, and a second edge 136c configured to form a lower line CL3, as described in FIG. 5, may be formed. Here, positions of the first edge 136b and the second edge 136c and positions of the upper line CL2 and the lower line CL3 appear to be reversed. This configuration is because when an aspherical lens is used as the plurality of emitting lenses 133a, the light incident to and output from the plurality of emitting lenses 133a is inversed (e.g., flipped).

Figure 14:
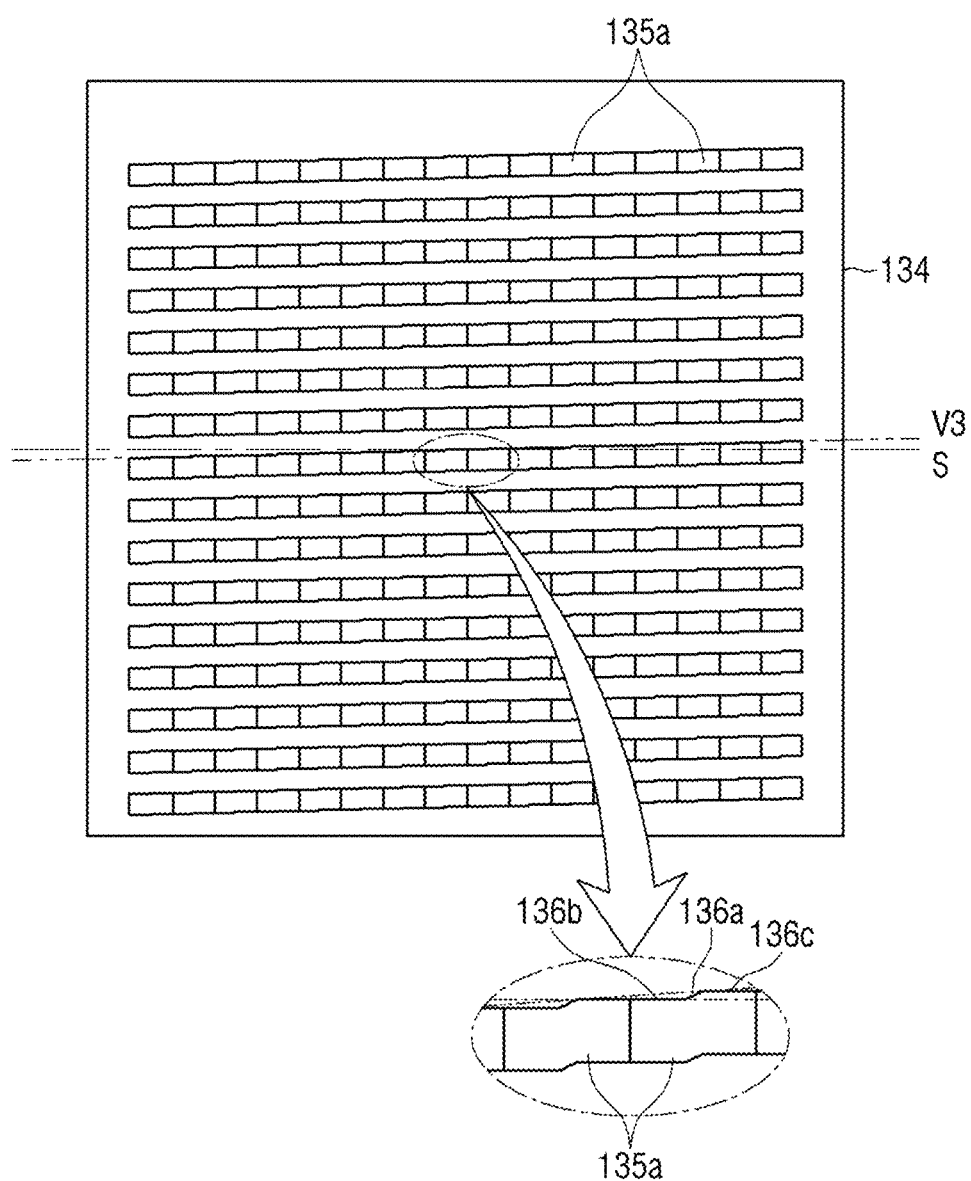
FIG. 14 is a schematic view showing a first shield according to the exemplary embodiment of the present disclosure.

The plurality of first shields 135a may be arranged such that rows that extend in the left-right direction are arranged in the up-down direction, and may be arranged such that the rows that extend in the left-right direction are inclined at a predetermined angle, as shown in FIG. 14. FIG. 14 represents when the plurality of first shields 135a are viewed from the rear of the second optical unit 134. The description that the plurality of first shields 135a are arranged such that the rows in the left-right direction are inclined at a predetermined angle may be understood that an imaginary line that connects a corresponding point of each of the plurality of first shields 135a, for example, an imaginary line V3 that connects the tops of the inclined edges 136a, may be arranged to have a predetermined angle with respect to the horizontal line S.

Figure 15:
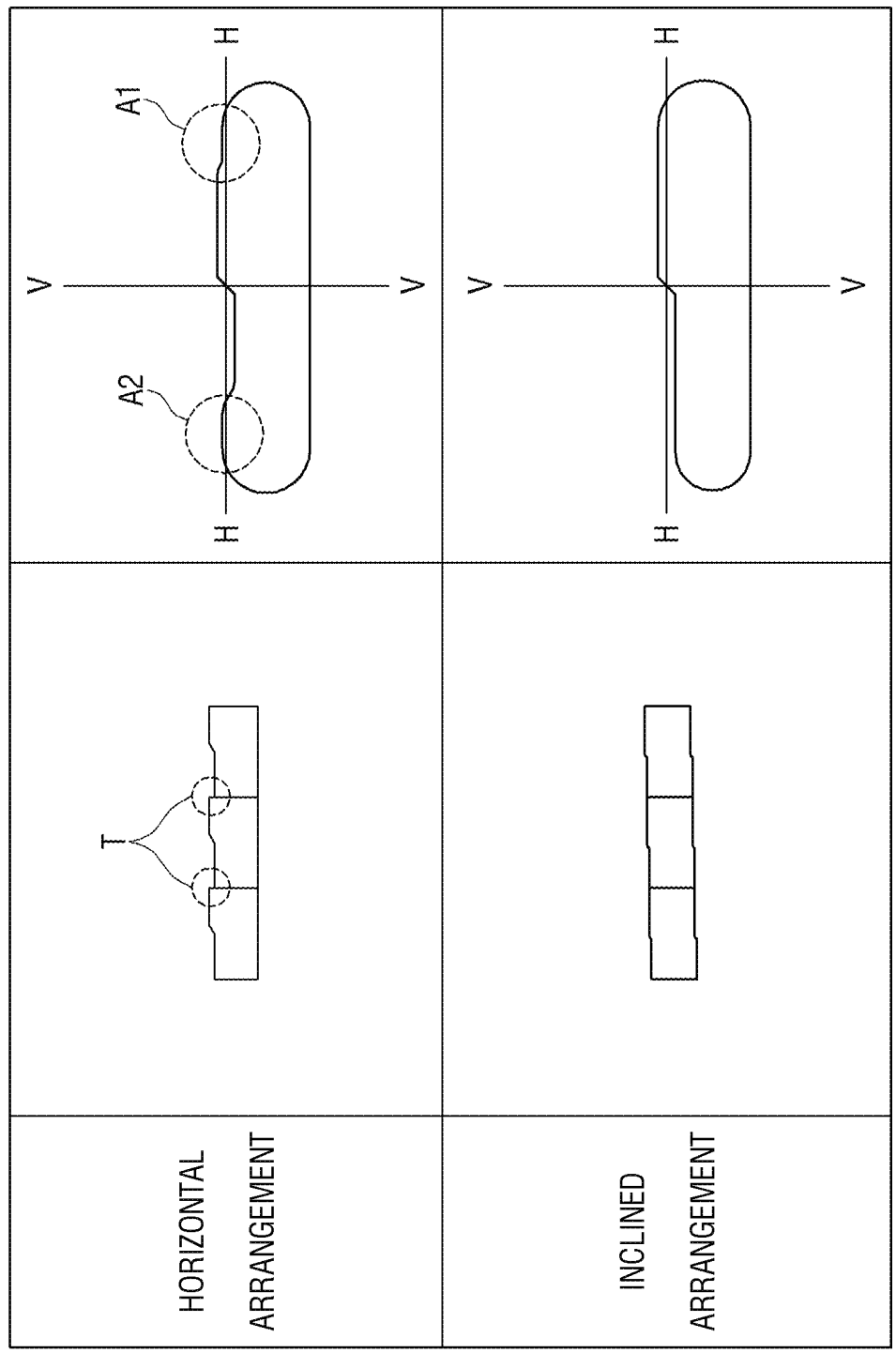
FIG. 15 is a schematic view showing a beam pattern with respect to an arrangement direction of the first shield according to the exemplary embodiment of the present disclosure.

Accordingly, the plurality of first shields 135a may be arranged such that the rows in the left-right direction are inclined at a predetermined angle. Due to this configuration, the first edge and the second edge of one of the plurality of first shields 135a may each have same heights (e.g., vertical positions) with the second edge and the first edge, respectively, of adjacent ones of the plurality of the first shields 135a. In other words, as shown in FIG. 15, when the plurality of first shields 135a are arranged such that the rows in the left-right direction are horizontal (shown in the top row), a step T occurs between the first edge of one of the plurality of first shields 135a and the second edge of an adjacent (i.e., left) one of the plurality of first shields 135a. Similarly, a step T also occurs between the second edge of the one of the plurality of first shields 135a and the first edge of another adjacent (i.e., right) one of the plurality of first shields 135a. Due to the step T, a portion A1 that is lower than the upper line CL2 and a portion A2 that is higher than the lower line CL3 are formed at both sides of the cut-off line CL. Not only does this make the driver feel uneasy, but also degrade the driver's field of view and generate glare to the driver of a proceeding or on-coming vehicle.

Accordingly, in an exemplary embodiment of the present disclosure, the steps may be prevented between the first shields adjacent to each other by arranging the plurality of first shields 135a such that the rows in the left-right direction are inclined at a predetermined angle with respect to the horizontal line.

When the plurality of first shields 135a are arranged such that the rows in the left-right direction are inclined at a predetermined angle, a position of a focal point may be changed compared to when the plurality of first shields 135a are horizontally arranged. Therefore, the plurality of incident lenses 131a and the plurality of emitting lenses 133a may be also arranged such that the rows in the left-right direction are inclined at a predetermined angle.

In an exemplary embodiment of the present disclosure, when the plurality of first shields 135a are arranged such that the rows in the left-right direction are inclined, they are arranged to be inclined upward in a direction from the first edge 136b to the second edge 136c. It may be understood that the first edge 136b may form the line CL2 that corresponds to a driving lane among the cut-off lines CL, and the second edge 136c may form the line CL3 that corresponds to an opposite lane among the cut-off lines CL, and thus, the plurality of first shields 135a may be arranged such that the rows in the left-right direction incline upward in a direction from the opposing lane toward the driving lane.

Figure 16:
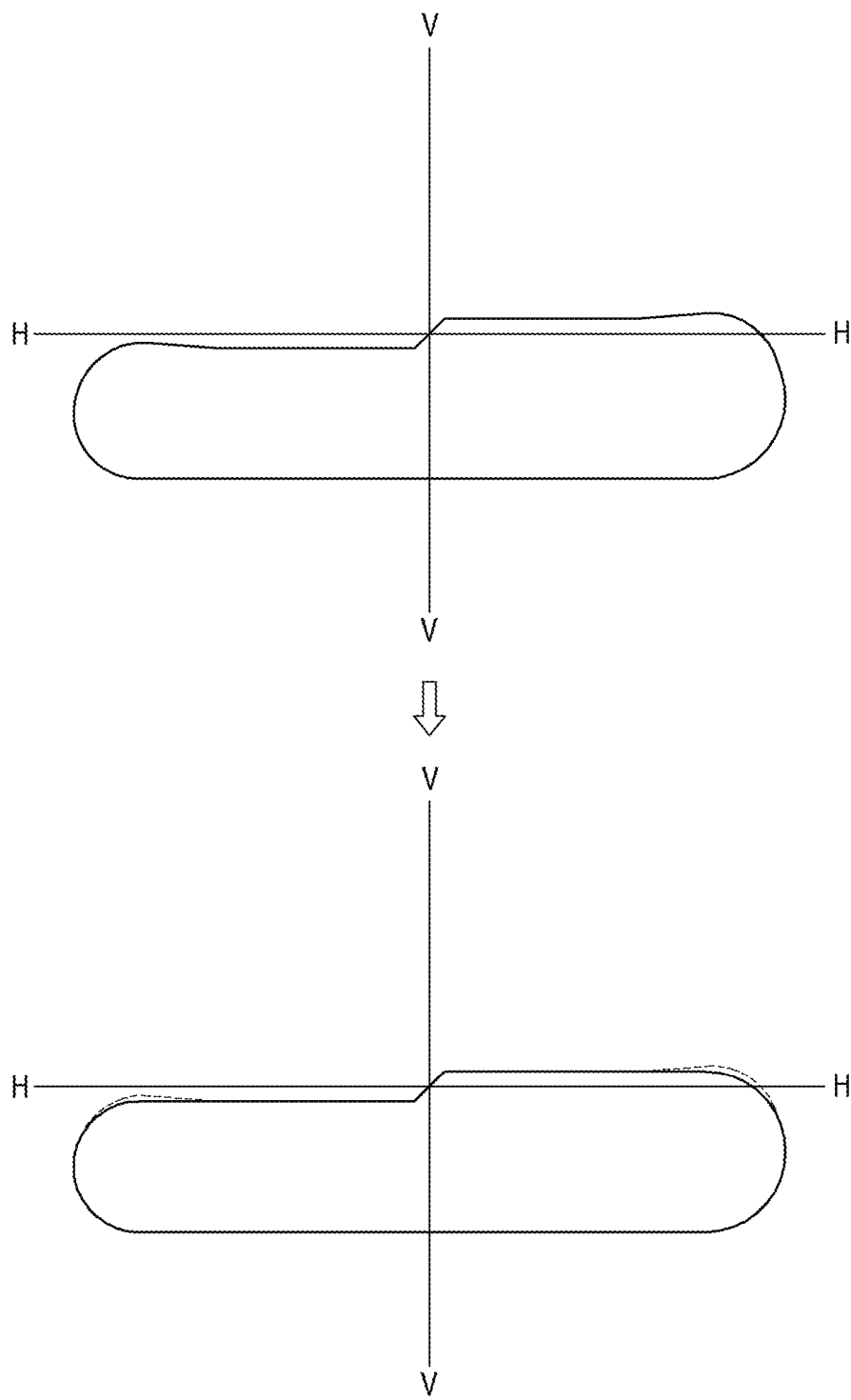
FIG. 16 is a schematic view showing a beam pattern formed by a second shield according to the exemplary embodiment of the present disclosure.

The plurality of second shields 135b may be provided to horizontally form the upper line CL2 and the lower line CL3 of the cut-off line CL. The upper line CL2 and the lower line CL3 of the cut-off line CL may be mainly formed by the light emitted from a lower portion of the plurality of emitting lenses 133a. As described in FIG. 16, due to the plurality of second shields 135b, the upper line CL2 and the lower line CL3 of the cut-off line CL may be horizontally formed as shown in the bottom panel of FIG. 16, whereas the beam pattern of the top panel of FIG. 16 is formed without the plurality of second shields 135b.

Figure 17:
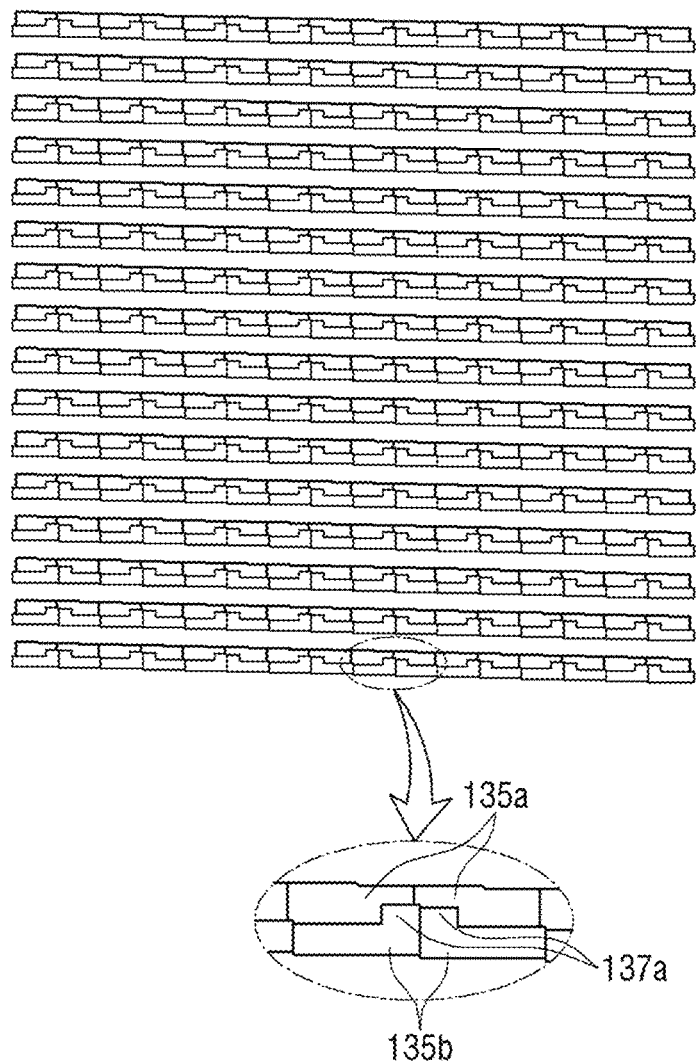
FIGS. 17 and 18 are schematic views showing the first shield and the second shield according to the exemplary embodiment of the present disclosure.
Figure 18:
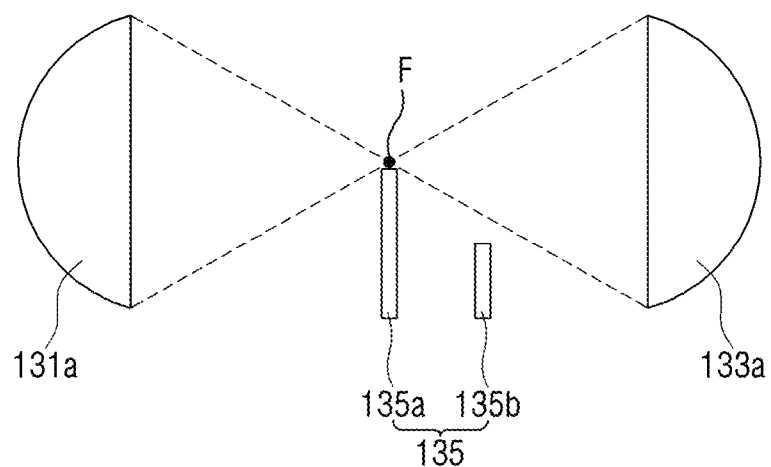

In an exemplary embodiment of the present disclosure, an upper end of each of the plurality of second shields 135b may be disposed below an upper end of the corresponding first shield among the plurality of first shields 135a as shown in FIGS. 17 and 18. This configuration is advantageous because if the upper end of each of the plurality of second shields 135b is the same as or higher than the upper ends of the plurality of first shields 135a in which the upper center portion is disposed at or near a rear focal point F of each of the plurality of emitting lenses 133a, more light is obstructed and the light efficiency decreases.

In addition, similar to the plurality of incident lenses 131a, the plurality of emitting lenses 133a, and the plurality of first shields 135a described above, the plurality of second shields 135b may be arranged such that the rows in the left-right direction incline upward in a direction from the first edge 136b toward the second edge 136c of the first shield 135a. Further, a protrusion 137a that protrudes upward may be formed at a portion of an upper end of each of the plurality of second shields 135b. The protrusion 137a may prevent glare from occurring to a driver of a proceeding or on-coming vehicle.

Among the plurality of lamp modules 100, 200, 300, 400, 500, and 600 described above, the focal length of the plurality of incident lenses in the lamp modules 100, 200, and 300 included in the first lamp unit 10 may be different from the focal length of the plurality of incident lenses in the lamp modules 400, 500, and 600 included in the second lamp unit 20. Accordingly, different regions may be formed in the beam pattern by the respective lamp units 10 and 20.

For example, the plurality of incident lenses of the lamp module 100, 200, and 300 included in the first lamp unit 10 may have a longer focal length than the plurality of emitting lenses of the lamp modules 100, 200 and 300 included in the first lamp unit 10, and the lamp modules 400, 500, and 600 included in the second lamp unit 10 may be configured such that the plurality of incident lenses and the plurality of emitting lenses have the same focal length.

Figure 19:
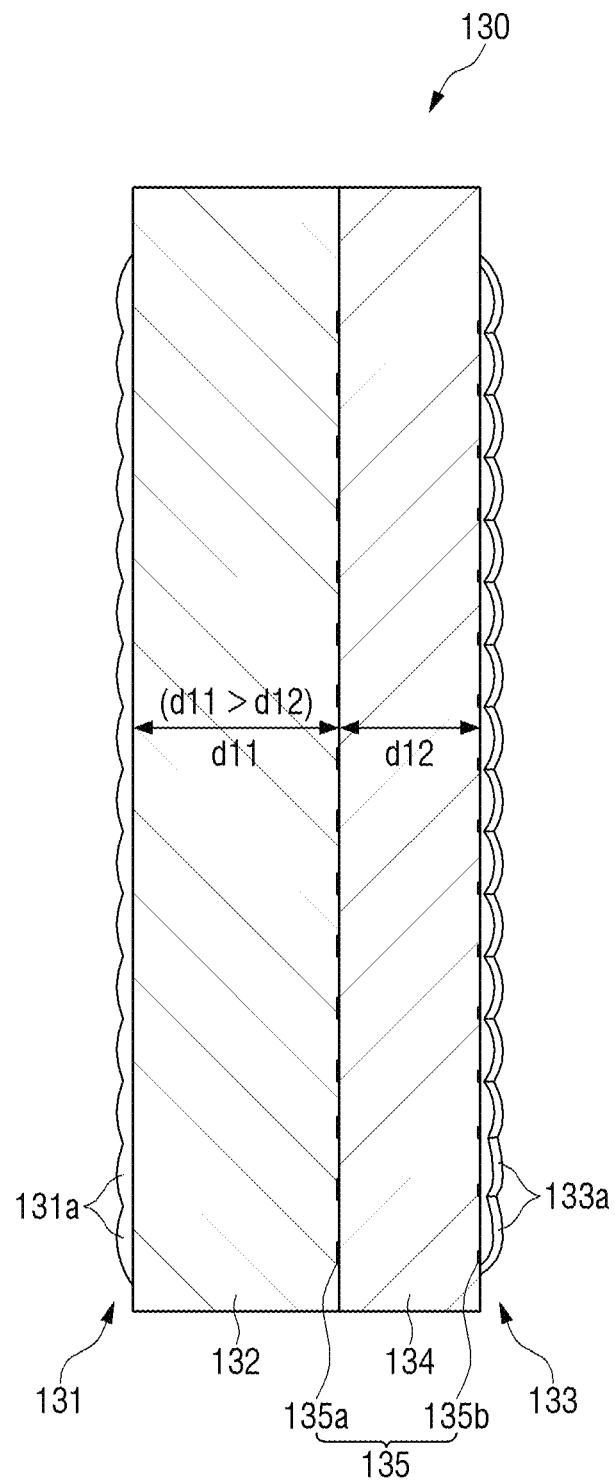
FIGS. 19 and 20 are schematic views showing a cross section of a lens unit according to the exemplary embodiment of the present disclosure.
Figure 20:
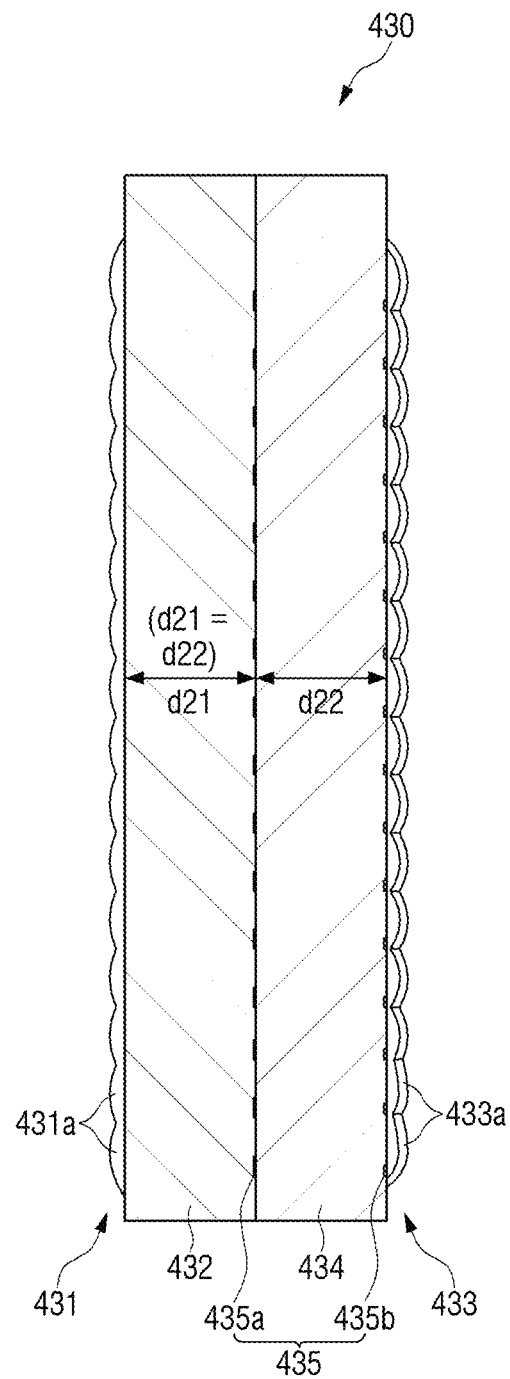

FIG. 19 is a schematic view showing a lens unit of a lamp module included in the first lamp unit according to the exemplary embodiment of the present disclosure, and FIG. 20 is a schematic view showing a lens unit of a lamp module included in the second lamp unit according to the exemplary embodiment of the present disclosure. FIG. 19 illustrates the first lamp module 100 of the first lamp unit, and FIG. 20 illustrates the fourth lamp module 400 of the second lamp unit.

Referring to FIG. 19, the lens unit 130 of the first lamp module 100 may include the incident lens unit 131 that includes the plurality of incident lenses 131a; the first optical unit 132 in which the incident lens unit 131 is formed on the incident surface thereof; the emitting lens unit 133 that includes the plurality of emitting lenses 133a; the second optical unit 134 in which the emitting lens unit 133 is formed on the emitting surface thereof and disposed so that the surface facing the first optical unit 132 contact each other; and the shield unit 135 that includes the plurality of first shields 135a and the plurality of second shields 135b respectively formed on the incidence and emitting surfaces of the second optical unit 134, each component being as described above.

Referring to FIG. 20, similar to the first lamp module 100, a lens unit 430 of the fourth lamp module 400 may include an incident lens unit 431 that includes the plurality of incident lenses 431a; a first optical unit 432 in which the incident lens unit 431 is formed on an incident surface thereof; an emitting lens unit 433 that includes a plurality of emitting lenses 433a; a second optical unit 434 in which an emitting lens unit 433 is formed on an emitting surface thereof and disposed so that a surface facing the first optical unit 132 contact each other; and a shield unit 435 that includes a plurality of first shields 435a and a plurality of second shields 435b respectively formed on the incidence and emitting surfaces of the second optical unit 434.

Referring to FIGS. 19 and 20, a thickness d11 in the front-rear direction of the first optical unit 132 of the first lamp module 100 may be greater than a thickness d12 of the second optical unit 134, and a thickness d21 in the front-rear direction of the first optical unit 432 of the fourth lamp module 400 may be equal to a thickness d22 of the second optical unit 434. Due to this configuration, the first lamp unit 10 may form a spread region that has a lower light intensity and a wider irradiation range, and the second lamp unit 20 may form a high illuminance region that has more concentrated light intensity.

Further, the thickness d11 of the first optical unit 132 of the first lamp module 100 may be greater than the thickness d21 of the first optical unit 432 of the fourth lamp module 400, and the thickness d12 of the second optical unit 134 of the first lamp unit 100 may be equal to the thickness d22 of the second optical unit 434 of the fourth lamp unit 400. Accordingly, a total thickness (d11+d12) of the lens unit 130 of the first lamp module 100 that forms the spread region may be greater than a total thickness (d21+d22) of the lens unit 430 of the fourth lamp module 400 that forms the high illuminance region.

As described above, in the first lamp module 100, the thickness d11 of the first optical unit 132 may be greater than the thickness d12 of the second optical unit 134. In order to increase the focal length of the plurality of incident lenses 131a, curvatures of the plurality of incident lenses 131a may be formed smaller than curvatures of the plurality of emitting lenses 133a. In other words, the plurality of incident lenses 131*a* may be flatter than the plurality of emitting lenses 133*a*. In the fourth lamp module 400, the thickness d21 of the first optical unit 432 and the thickness d22 of the second optical unit 434 may be equal. Therefore, the plurality of incident lenses 431*a* and the plurality of emitting lenses 433*a* may be formed to have a same curvature.

Further, since the thickness d11 of the first optical unit 132 of the first lamp module 100 that forms the spread region is greater than the thickness d21 of the first optical unit 432 of the fourth lamp module 400 that forms the high illuminance region, the focal length of the plurality of incident lenses 431*a* of the fourth lamp module 400 may be smaller than the focal length of the plurality of incident lenses 131*a* of the first lamp module 100. Accordingly, curvatures of the plurality of incident lenses 431*a* of the fourth lamp module 400 may be greater than curvatures of the plurality of incident lenses 131*a* of the first lamp module 100.

As described above, the lamp for the vehicle 1 of the present disclosure may control the region formed by the light emitted from the plurality of emitting lenses in the beam pattern by adjusting the focal length of the plurality of incident lenses. Therefore, the beam pattern may be more easily formed.

Each of light sources of the first to sixth lamp modules 100, 200, 300, 400, 500, and 600 described above may be disposed at or below an extension line that passes in the left-right direction through a rear focus of the optical path adjusting unit. More particularly, the light sources of the first to third lamp modules 100, 200, and 300 that form the spread region P1 may be disposed below the light sources of the fourth to sixth lamp modules 400, 500, and 600 that form the high illuminance region P2.

For example, in an exemplary embodiment of the present disclosure, the light sources of the fourth to sixth lamp modules 400, 500, and 600 described above may be disposed at or below the extension line that passes in the left-right direction through the rear focus of the optical path adjusting unit, and the light sources of the first to third lamp modules 100, 200, and 300 may be disposed farther below the light sources of the fourth to sixth lamp modules 400, 500, and 600. Accordingly, the fourth to sixth lamp modules 400, 500, and 600 may improve the concentration of light so that the high illuminance region P2 may have increased brightness, and the first to third lamp modules 100, 200, and 300 may spread the light better, thereby improving the spread characteristics.

In first lamp unit 10 described above, the light sources of the first to third lamp modules 100, 200, and 300 may have different positions with respect to the rear focus of the light path adjusting unit. For example, as shown in FIG. 21, among the first to third lamp modules 100, 200, and 300, a light source 112 of the first lamp module 100 that is disposed at the innermost position may be disposed on the extension line that passes in the up-down direction through a rear focus BF of the optical path adjusting unit, and light sources 212 and 312 of the second and third lamp modules 200 and 300 may be spaced apart by predetermined intervals toward at least one of both sides of the light source 112 of the first lamp module 100. More particularly, each of the light sources 212 and 312 of the second and third lamp modules 200 and 300 (i.e., the center of each light source) may be horizontally spaced apart toward any one of both directions by a predetermined interval with respect to the extension line that passes in the up-down direction through the rear focus BF of the optical path adjusting unit. Accordingly, each of the light sources of the first to third lamp modules 100, 200, and 300 may be spaced apart in the left-right direction.

For example, each of the light sources 212 and 312 of the second and third lamp modules 200 and 300 may be respectively disposed on each side of the light source 112 of the first lamp module 100. More particularly, each of the light sources 212 and 312 of the second and third lamp modules 200 and 300 may be respectively disposed on each side with respect to the extension line that passes in the up-down direction through the rear focus BF of the optical path adjusting unit. Due to this configuration, the light distribution performance required for a light irradiation angle in the left-right direction may be satisfied with the lamp for the vehicle 1 of the present disclosure.

In addition, any one of the light sources of the first to third lamp modules 100, 200, and 300 may be disposed above another. This is because the cut-off line CL includes the inclined line CL1 as shown in FIG. 5 described above. Positions of the light sources of the first to third lamp modules 100, 200, and 300 may be varied depending on a shape of the cut-off line.

Further, among the first to third lamp modules 100, 200, and 300, the light source 112 of the first lamp module 100 that is disposed at the innermost position may be disposed on the extension line that passes in the up-down direction through the rear focus BF of the light path adjusting unit. When the light generated from the lamp for the vehicle 1 of the present disclosure is irradiated to the outside of the vehicle through the cover lens, as a distance from the cover lens increases, the light obstructed by the shielded region around the cover lens increases, and the light efficiency decreases. Therefore, in order to increase the light efficiency, the light source of the first lamp module 100 having a relatively closer distance from the cover lens may be disposed on the extension line that passes in the up-down direction through the rear focus of the optical path adjusting unit.

Figure 22:
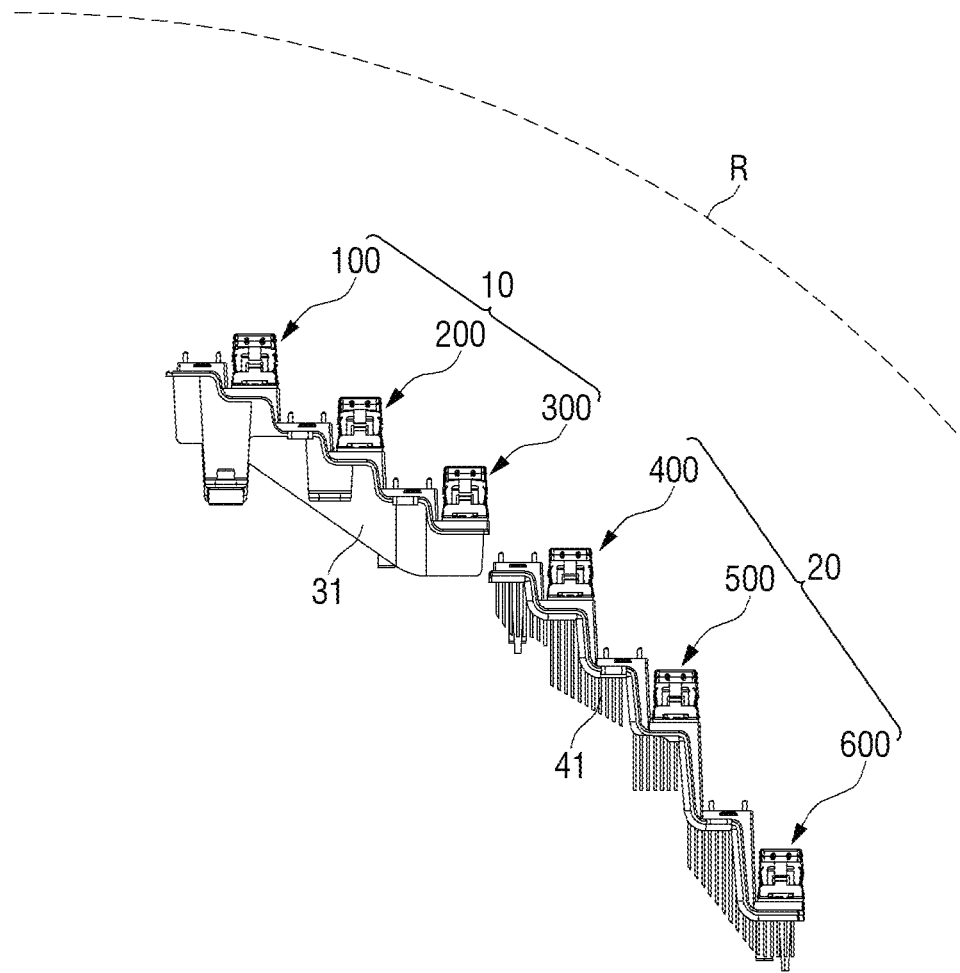
FIG. 22 is a schematic view showing a lamp for a vehicle and an exterior surface of a vehicle according to the exemplary embodiment of the present disclosure.

In other words, in the first to sixth lamp modules 100, 200, 300, 400, 500, and 600 of the lamp for the vehicle 1 of the present disclosure, as shown in FIG. 22, although a distance from an exterior surface R of the vehicle (e.g., an exterior surface of the cover lens or the like) may increase going from inboard toward outboard (i.e., from left to right as shown in FIG. 22), light loss may be reduced by positioning the light source 112 of the first lamp module 100 that is the closest to the vehicle's outer surface R on the extension line that passes in the up-down direction through the rear focus BF of the optical path adjusting unit.

Figure 23:
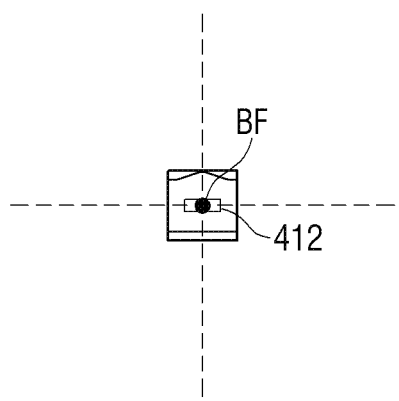
FIG. 23 is a schematic view showing the light source of the lamp module included in the first lamp unit according to the exemplary embodiment of the present disclosure.
Figure 23:
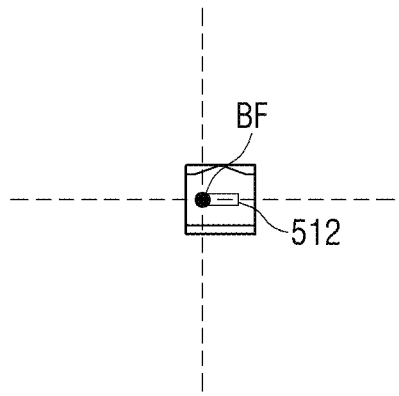
Figure 23:
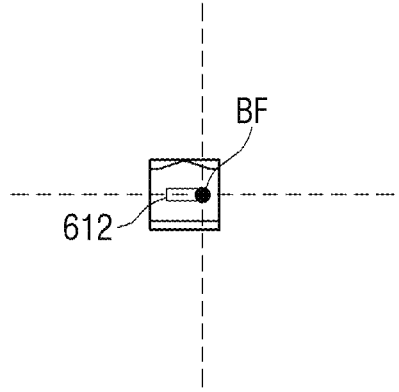

In addition, in the second lamp unit 20, for similar reasons as the first lamp unit 10 as shown in FIG. 23, a light source 412 of the fourth lamp module 400 disposed at the innermost among the fourth to sixth lamp modules 400, 500, and 600 may be disposed on the extension line that passes in the up-down direction through the rear focus BF of the light path adjusting unit, and light sources 512 and 612 of the fifth and sixth lamp modules 500 and 600 may be spaced apart by a predetermined interval toward at least one of both sides with respect to the light source 412 of the fourth lamp module 400. In other words, the light sources 512 and 612 of the fifth and sixth lamp modules 500 and 600 (i.e., the center of each light source) may be horizontally spaced apart toward any one of both directions by a predetermined interval with respect to the extension line that passes in the up-down direction through the rear focus BF of the optical path adjusting unit. Accordingly, each of the light sources of the fourth to sixth lamp modules 400, 500, and 600 may be spaced apart in the left-right direction. In other words, vertical extension lines extended from the centers of the fourth to sixth light sources 412, 512, and 612 of the fourth to sixth lamp modules 400, 500, and 600 may be horizontally spaced apart from each other.

In addition, any one of the light sources of each of the fourth to sixth lamp modules 400, 500, and 600 may be disposed above another. This is because the cut-off line CL includes the inclined line CL1 as shown in FIG. 5 described above. Positions of the light sources of the fourth to sixth lamp modules 400, 500, and 600 may be varied depending on a shape of the cut-off line.

Figure 24:
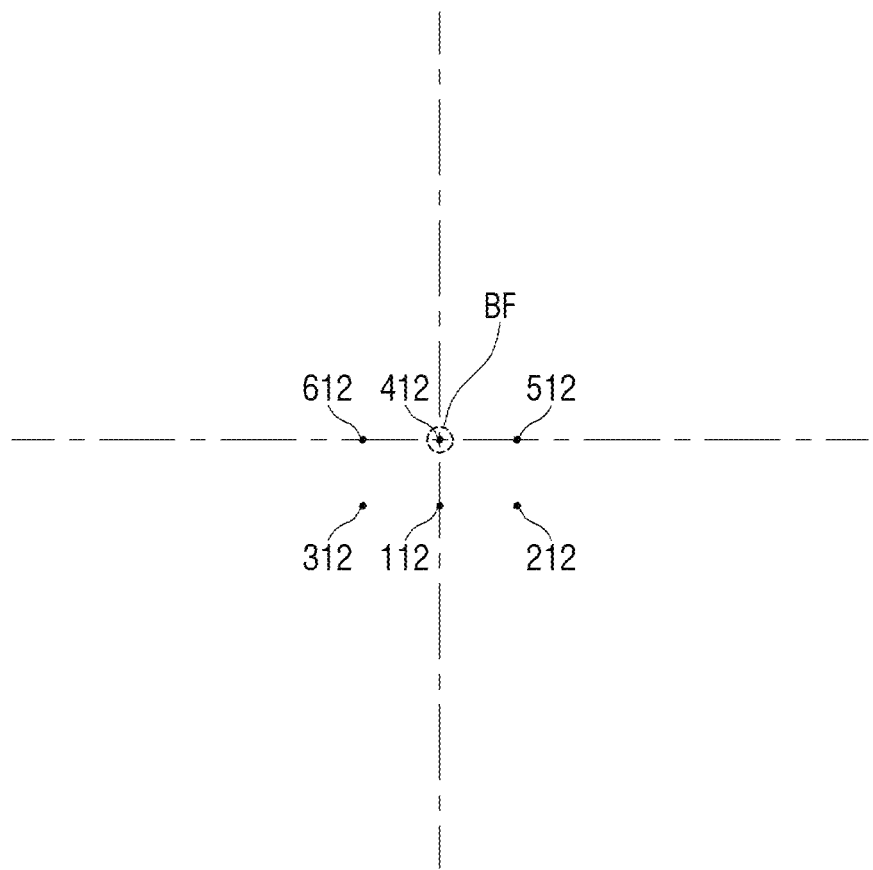
FIG. 24 is a schematic view showing a position of a light source of a plurality of lamp modules according to the exemplary embodiment of the present disclosure.

As described above, each of the light sources 112, 212, 312, 412, 512, and 612 of the first to sixth lamp modules 100, 200, 300, 400, 500, and 600 may have different positions with respect to the rear focal point BF of the light path adjusting unit as shown in FIG. 24. FIG. 24 depicts an optical axis of each light source instead of showing the entire light source for convenience of description.

In the exemplary embodiment as described above, it is described as an example in which the lamp for the vehicle 1 of the present disclosure forms a single beam pattern, that is, a low beam pattern P. However, the present disclosure is not limited thereto, and the lamp for the vehicle 1 of the present disclosure may form two or more beam patterns simultaneously.

Figure 25:
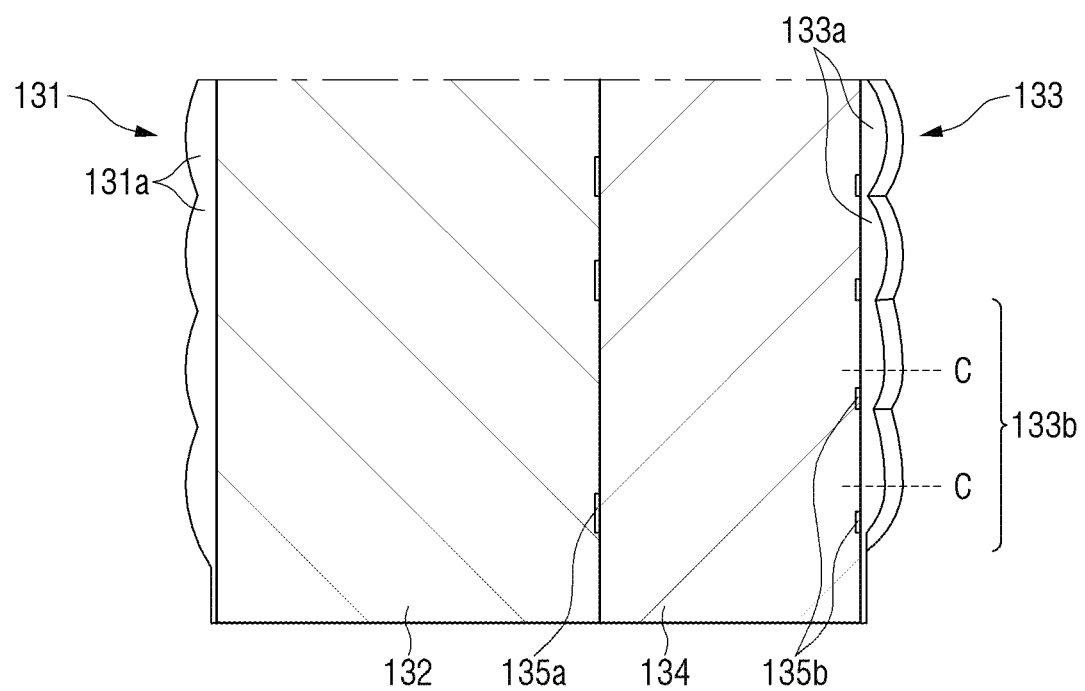
FIG. 25 is a schematic view showing a cross section of a lens unit according to another exemplary embodiment of the present disclosure.

FIG. 25 is a cross-sectional view of a lens unit according to another exemplary embodiment of the present disclosure, and FIG. 25 depicts the first lamp module 100 among the first to sixth lamp modules 100, 200, 300, 400, 500, and 600 for description purposes. Similar explanation may be made for the second to sixth lamp modules 200, 300, 400, 500, and 600. Referring to FIG. 25, an emitting lens that forms at least one row 133*b* in the left-right direction among the plurality of emitting lenses 133*a* may be formed asymmetrically so that an upper side and a lower side have different lengths and/or different curvatures with respect to a reference line C that extends in the front-rear direction of the emitting lens.

Figure 27:
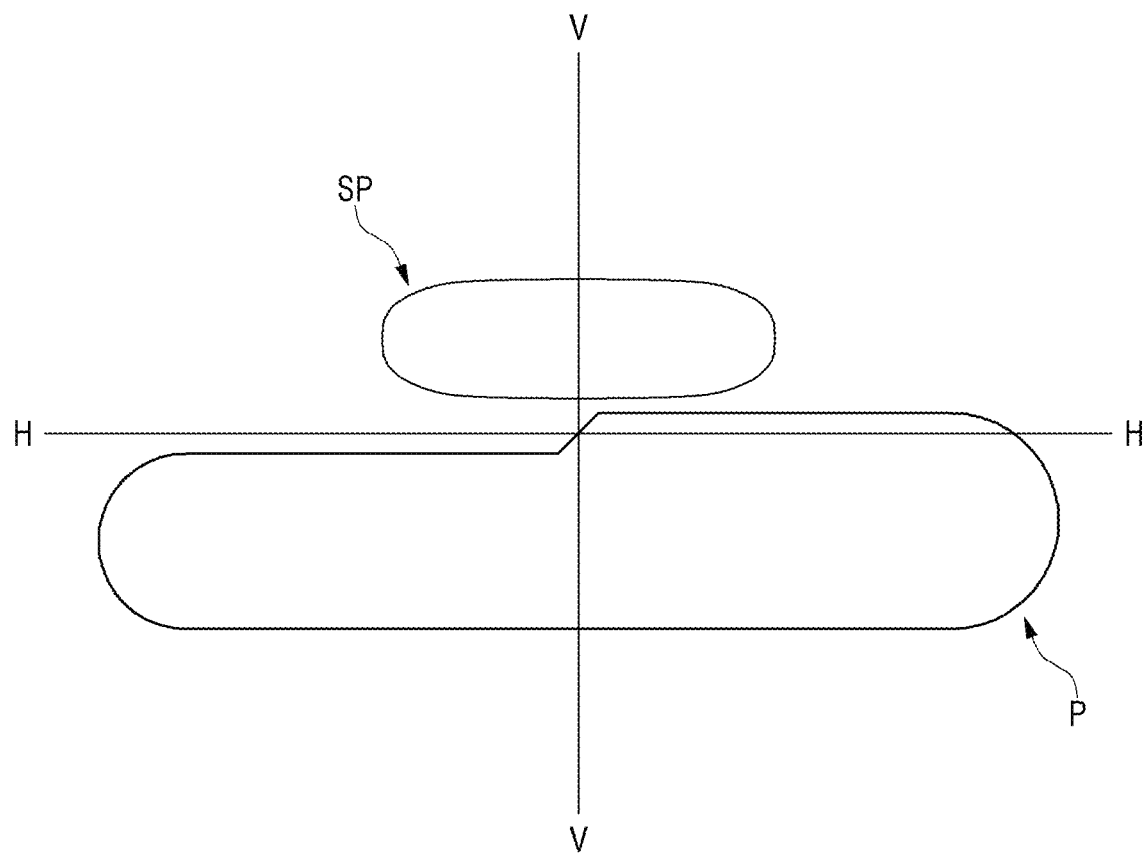
FIG. 27 is a schematic diagram showing a beam pattern formed by the lens unit according to the another exemplary embodiment of the present disclosure.

In the another exemplary embodiment of the present disclosure, it is described as an example in which a signal beam pattern SP that facilitates identification of a road sign, which is usually disposed above the driver's field of view, is simultaneously formed together with the low beam pattern P as shown in FIG. 27. However, the present disclosure is not limited thereto, and various beam patterns as well as signal beam patterns may be formed depending on a length or curvature of the upper and lower sides with respect to the reference line C.

In addition, in the another exemplary embodiment of the present disclosure, it is described as an example in which, among the plurality of emitting lenses 133*a*, emitting lenses that form two rows 133*b* disposed at a lower side of the emitting lens portion 133 forms a signal beam pattern. However, this arrangement is only an example to help the understanding of the present disclosure. The present disclosure is not limited thereto, and rows of the emitting lenses that form the signal beam pattern may be variously changed.

In the another exemplary embodiment of the present disclosure, among the plurality of emitting lenses 133*a*, the emitting lenses that form two rows 133*b* disposed at the lower side of the emitting lens portion 133 may form the signal beam pattern. This configuration may prevent potential interference by a bezel 32 or the like which is disposed on a path of light that is emitted relatively upward.

In one of the two rows 133*b*, the first shield may be omitted, and in the other of the two rows 133*b*, both the first shield 135*a* and the second shield 135*b* may be formed.

However, this is only an example for helping the understanding of the present disclosure, and the present disclosure is not limited thereto.

Figure 26:
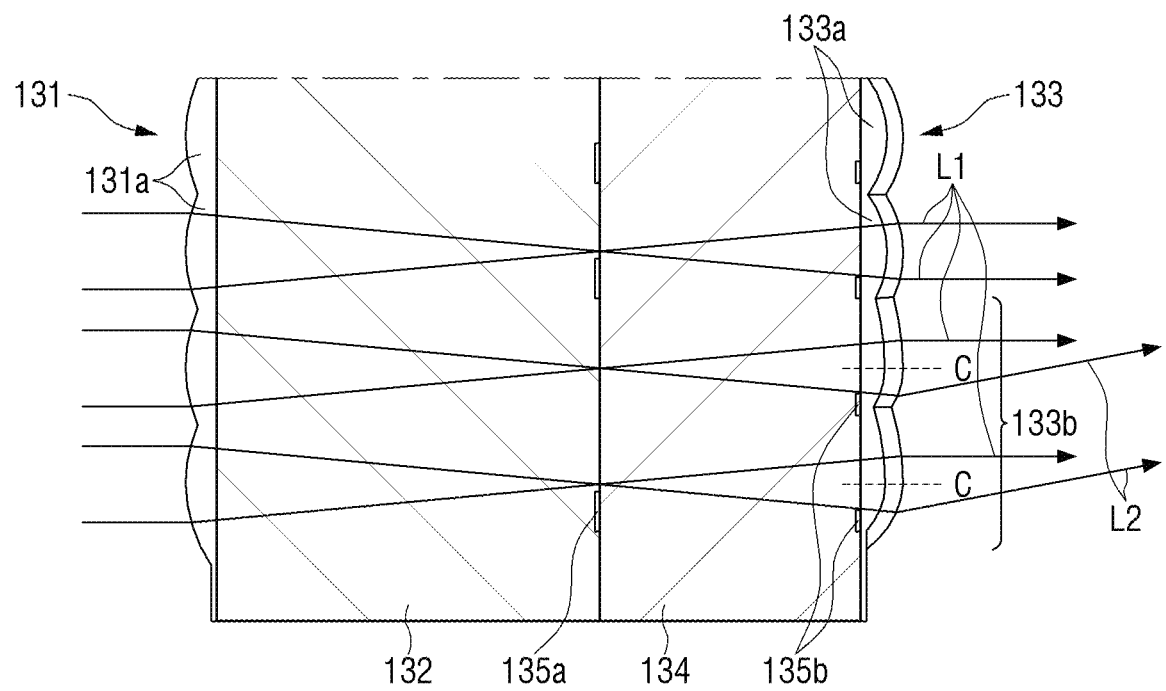
FIG. 26 is a schematic diagram showing an optical path of the lens unit according to the another exemplary embodiment of the present disclosure.

When the two rows 133*b* disposed at the lower side of the emitting lens unit 133 form a signal beam pattern as shown in FIG. 25, light L2 that is emitted through the lower side with respect to the reference line C may proceed toward the upper side relative to the other light L1, as shown in FIG. 26. Therefore, as shown in FIG. 27, a signal beam pattern SP may be formed above the low beam pattern P.

In an exemplary embodiment of the present disclosure, it is described as an example in which a signal beam pattern SP disposed above a low beam pattern P is formed together with the low beam pattern P. Therefore, the emitting lens of at least one row disposed at the lower side of the emitting lens unit 133 of the lens unit 130 may be formed so that the lower side thereof has a greater curvature than the upper side thereof with respect to the reference line C, and thus, the light may be directed more upward.

As described above, in the lamp for the vehicle 1 of the present disclosure, due to the arrangement of the light source 112, 212, 312, 412, 512, and 612 in each of the plurality of lamp modules 100, 200, 300, 400, 500, and 600 arranged in the left-right direction, the light distribution performance of the beam pattern formed by the lamp for the vehicle 1 of the present disclosure may be more easily satisfied. In addition, different beam patterns may be simultaneously formed by adjusting the curvature of the emitting lens 133*a*. Therefore, the configuration may be simplified, and the cost may be reduced.

In concluding the detailed description, those skilled in the art will appreciate that many variations and modifications can be made to the exemplary embodiments without departing from the principles of the present disclosure. Therefore, the disclosed exemplary embodiments of the disclosure are used in a generic and descriptive sense only and not for purposes of limitation.

What is claimed is:

1. A lamp for a vehicle comprising a plurality of lamp modules,
   wherein each of the plurality of lamp modules comprises:
      a light source unit including a light source;
      an optical path adjusting unit that adjusts a path of light generated from the light source unit; and
      a lens unit that emits the light incident from the optical path adjusting unit to form a first beam pattern, and
   wherein the lens unit comprises:
      an incident lens unit including a plurality of incident lenses;
      an emitting lens unit including a plurality of emitting lenses;
      a shield unit disposed between the incident lens unit and the emitting lens unit to obstruct a portion of the light incident on the plurality of emitting lenses;
      a first optical unit in which the incident lens unit is formed on an incident surface thereof; and
      a second optical unit disposed in front of the first optical unit, wherein the emitting lens unit is formed on an emitting surface of the second optical unit,
   wherein a first set of the plurality of lamp modules have a thickness of the first optical unit, measured in a front-and-rear direction, that is different from a thickness of the first optical unit in a second set of the plurality of lamp modules,
   wherein the first set of the plurality of lamp modules form a high illuminance region of the first beam pattern, and the second set of the plurality of lamp modules form a spread region of the first beam pattern, and wherein the thickness of the first optical unit in the first set of the plurality of lamp modules is smaller than the thickness of the first optical unit in the second set of the plurality of lamp modules.

2. The lamp for the vehicle of claim 1, wherein the optical path adjusting unit adjusts the path of the light to allow the light generated from the light source unit to proceed substantially parallel to an optical axis of the light source.

3. The lamp for the vehicle of claim 1, wherein the optical path adjusting unit comprises at least one of an aspherical lens, a Fresnel lens, or a total internal reflection (TIR) lens.

4. The lamp for the vehicle of claim 1, wherein the optical path adjusting unit includes an incidence surface of a flat shape and an emitting surface of an aspherical shape.

5. The lamp for the vehicle of claim 1, wherein in the first set of the plurality of lamp modules, the first optical unit and the second optical unit have a same thickness.

6. The lamp for the vehicle of claim 1, wherein in the second set of the plurality of lamp modules, a thickness of the first optical unit is greater than a thickness of the second optical unit.

7. The lamp for the vehicle of claim 1, wherein a focal length of the plurality of incident lenses in the first set of the plurality of lamp modules is shorter than a focal length of the plurality of incident lenses in the second set of the plurality of lamp modules.

8. The lamp for the vehicle of claim 7, wherein a curvature of the plurality of incident lenses in the first set of the plurality of lamp modules is greater than a curvature of the plurality of incident lenses in the second set of the plurality of lamp modules.

9. The lamp for the vehicle of claim 1, wherein the shield unit comprises a plurality of first shields and a plurality of second shields respectively formed on an incident surface and an emitting surface of either of the first optical unit or the second optical unit.

10. The lamp for the vehicle of claim 1, wherein the plurality of emitting lenses are arranged in rows, each extending in a left-right direction, and the rows are arranged in an up-down direction, and wherein the emitting lens unit is configured to form a second beam pattern that is different from the first beam pattern by at least one of a plurality of rows arranged in the up-down direction.

11. The lamp for the vehicle of claim 10, wherein the emitting lens unit is configured to form the second beam pattern by at least one row disposed at a lower side of the emitting lens unit.

12. The lamp for the vehicle of claim 10, wherein the light that is incident on an emitting lens of at least one row that forms the second beam pattern is partially obstructed by at least one of a first shield or a second shield disposed in front of the first shield.

13. The lamp for the vehicle of claim 10, wherein an emitting lens of at least one row that forms the second beam pattern has an upper side and a lower side formed asymmetrically with respect to a reference line that extends in a front-rear direction.

14. The lamp for the vehicle of claim 13, wherein in the emitting lens of the at least one row that forms the second beam pattern, the upper side and the lower side have different curvatures.

15. The lamp for the vehicle of claim 13, wherein in the emitting lens of the at least one row that forms the second beam pattern, the upper side and the lower side have different lengths in the up-down direction.

16. A lamp for a vehicle comprising a plurality of lamp modules, wherein each of the plurality of lamp modules comprises:
a light source unit including a light source;
an optical path adjusting unit that adjusts a path of light generated from the light source unit; and
a lens unit that emits the light incident from the optical path adjusting unit to form a first beam pattern, and wherein the lens unit comprises:
an incident lens unit including a plurality of incident lenses;
an emitting lens unit including a plurality of emitting lenses; and
a shield unit disposed between the incident lens unit and the emitting lens unit to obstruct a portion of the light incident on the plurality of emitting lenses, wherein the plurality of emitting lenses are arranged in rows, each extending in a left-right direction, and the rows are arranged in an up-down direction, wherein the emitting lens unit is configured to form a second beam pattern that is different from the first beam pattern by at least one of a plurality of rows arranged in the up-down direction, wherein an emitting lens of at least one row that forms the second beam pattern has an upper side and a lower side formed asymmetrically with respect to a reference line that extends in a front-rear direction, and wherein in the emitting lens of the at least one row that forms the second beam pattern, the upper side and the lower side have different lengths in the up-down direction.

17. The lamp for the vehicle of claim 16, wherein the lens unit further comprises:
a first optical unit in which the incident lens unit is formed on an incident surface thereof; and
a second optical unit disposed in front of the first optical unit, wherein the emitting lens unit is formed on an emitting surface of the second optical unit.

18. The lamp for the vehicle of claim 16, wherein the emitting lens unit is configured to form the second beam pattern by at least one row disposed at a lower side of the emitting lens unit.

19. The lamp for the vehicle of claim 16, wherein the light that is incident on an emitting lens of at least one row that forms the second beam pattern is partially obstructed by at least one of a first shield or a second shield disposed in front of the first shield.

20. The lamp for the vehicle of claim 16, wherein in the emitting lens of the at least one row that forms the second beam pattern, the upper side and the lower side have different curvatures.

* * * * *